United States Patent
Aykroyd et al.

(10) Patent No.: US 10,405,395 B2
(45) Date of Patent: Sep. 3, 2019

(54) CONTROLLABLE POWER AND LIGHTING ARRANGEMENT

(71) Applicant: Intelligent Growth Solutions Limited, Dundee (GB)

(72) Inventors: Henry Aykroyd, Dundee (GB); David Scott, Dundee (GB)

(73) Assignee: Intelligent Growth Solutions Limited c/o The James Hutton Institute, Dundee (GB)

( * ) Notice: Subject to any disclaimer, the term of this patent is extended or adjusted under 35 U.S.C. 154(b) by 0 days.

(21) Appl. No.: 15/504,830

(22) PCT Filed: Aug. 20, 2015

(86) PCT No.: PCT/GB2015/052423
§ 371 (c)(1),
(2) Date: Feb. 17, 2017

(87) PCT Pub. No.: WO2016/027095
PCT Pub. Date: Feb. 25, 2016

(65) Prior Publication Data
US 2018/0228000 A1 Aug. 9, 2018

(30) Foreign Application Priority Data

Aug. 21, 2014 (GB) .................................. 1414898.5
Aug. 21, 2014 (GB) .................................. 1414899.3
Nov. 7, 2014 (GB) .................................. 1419851.9

(51) Int. Cl.
*H05B 33/08* (2006.01)
*F21S 2/00* (2016.01)
(Continued)

(52) U.S. Cl.
CPC ............ *H05B 33/0866* (2013.01); *F21S 2/00* (2013.01); *F21S 4/28* (2016.01); *H01R 25/147* (2013.01);
(Continued)

(58) Field of Classification Search
CPC ...... H05B 33/0866; F21S 4/28; H01R 25/147
(Continued)

(56) References Cited

U.S. PATENT DOCUMENTS 3,781,567 A 12/1973 Papsco
8,100,552 B2 1/2012 Spero
(Continued)

FOREIGN PATENT DOCUMENTS

CA 2790162 A1 9/2011
CN 101043779 A 9/2007
(Continued)

OTHER PUBLICATIONS

International search report for PCT/GB2015/052423, dated Mar. 23, 2016.

*Primary Examiner* — Daniel D Chang
(74) *Attorney, Agent, or Firm* — Brinks Gilson & Lione

(57) ABSTRACT

There is provided herein controllable power and lighting arrangement suitable for use in commercial and/or domestic applications. There is particularly provided a method for the arrangement and automatic control of light emitting diode (LED) lights, and optionally non-LED based devices, powered by low voltage AC power distributed on bus bars. In addition there is provided a power and lighting arrangement which is especially suitable for use in a uniform and safe manner in close proximity to living organisms, particularly organisms capable of growth, such as plants, in a domestic or commercial growth system.

20 Claims, 20 Drawing Sheets

(51) Int. Cl.
*H05B 37/02* (2006.01)
*F21S 4/28* (2016.01)
*H01R 25/14* (2006.01)
*A01G 7/04* (2006.01)

(52) U.S. Cl.
CPC ..... *H05B 33/0803* (2013.01); *H05B 33/0809* (2013.01); *H05B 37/0245* (2013.01); *A01G 7/045* (2013.01); *Y02P 60/149* (2015.11)

(58) Field of Classification Search
USPC .......................................................... 315/294
See application file for complete search history.

(56) References Cited

U.S. PATENT DOCUMENTS

| | | |
|---|---|---|
| 2004/0189555 A1 | 9/2004 | Capen |
| 2008/0266842 A1* | 10/2008 | Skidmore ................ E04B 9/32 362/147 |
| 2009/0301979 A1 | 12/2009 | Tanaka |
| 2011/0062888 A1 | 3/2011 | Bondy |
| 2012/0060416 A1 | 3/2012 | Brusatore |
| 2014/0028191 A1 | 1/2014 | Leshniak |
| 2014/0042933 A1 | 2/2014 | Livschitz |
| 2014/0191746 A1 | 7/2014 | Davie |
| 2016/0057836 A1* | 2/2016 | Aykroyd ............ H05B 37/0272 307/31 |

FOREIGN PATENT DOCUMENTS

| | | |
|---|---|---|
| CN | 102231929 | 11/2011 |
| CN | 102340138 A | 2/2012 |
| CN | 202721859 U | 2/2013 |
| CN | 103229598 A | 7/2013 |
| CN | 203942684 U | 11/2014 |
| GB | 2335334 A | 9/1999 |
| WO | 2011087680 | 7/2011 |
| WO | 2013098744 A2 | 7/2013 |
| WO | 2014045152 | 3/2014 |

* cited by examiner

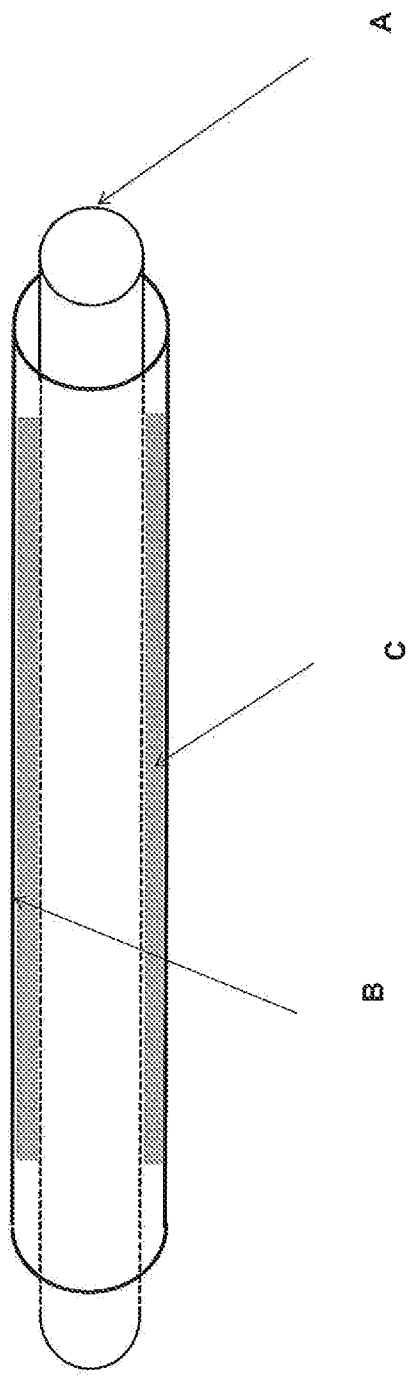
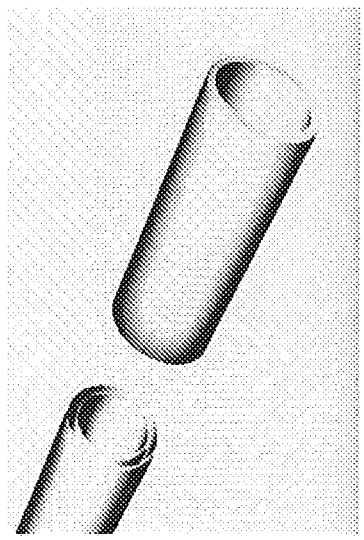
Figure 2
Figure 2(a)
Figure 2(b)

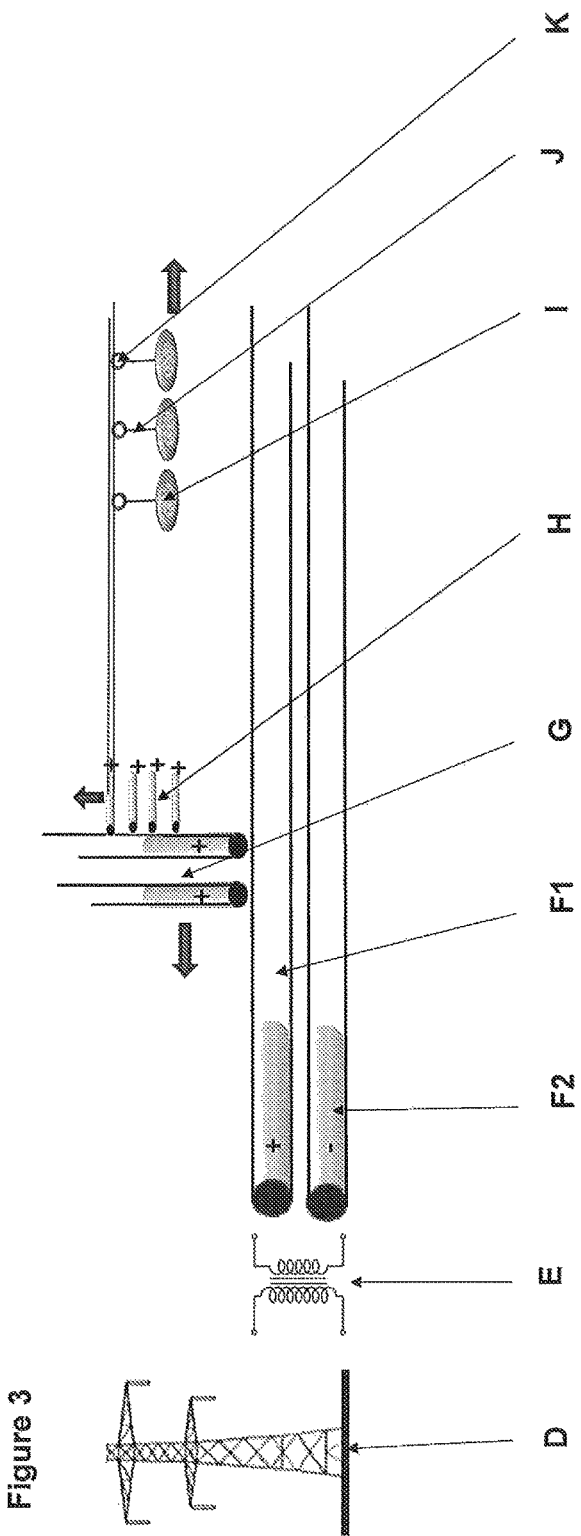

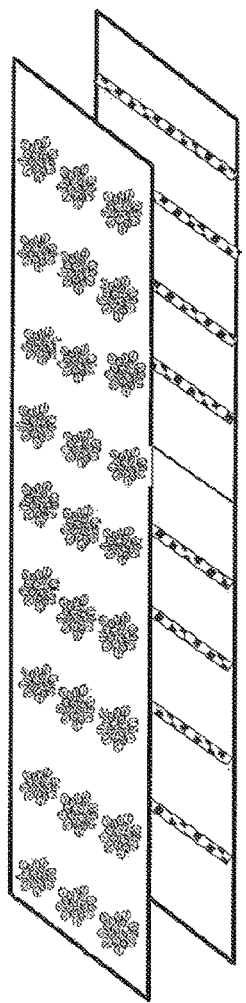
FIGURE 18
FIGURE 18A
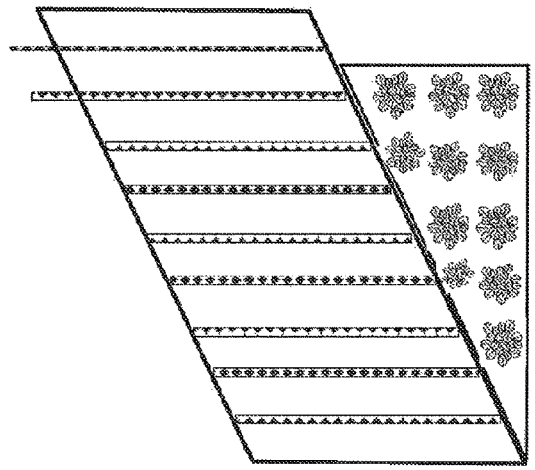
FIGURE 18B

CONTROLLABLE POWER AND LIGHTING ARRANGEMENT

CROSS-REFERENCE TO RELATED APPLICATIONS

This application is a National Stage application of International Application No. PCT/GB2015/052423, filed Aug. 20, 2015. This application also claims priority under 35 U.S.C. § 119 to Great Britain Application No. 1414899.3, filed Aug. 21, 2014, Great Britain Application No. 1414898.5, filed Aug. 21, 2014, and Great Britain Application No. 1419851.9, filed Nov. 7, 2014.

FIELD OF THE INVENTION

The present invention relates to a novel controllable power and lighting arrangement suitable for use in commercial and/or domestic applications. The invention particularly relates to a method for the arrangement and automatic control of light emitting diode (LED) lights, and optionally non-LED based devices, powered by low voltage AC power distributed on bus bars. In addition the novel power and lighting arrangement is suitable for use in a uniform and safe manner in close proximity to living organisms, particularly organisms capable of growth, such as plants, in a domestic or commercial growth system. The invention also concerns a controllable power and lighting arrangement for lighting devices, including light emitting diode (LED) lights, and non-lighting devices, which distributes power and light in a uniform and safe manner.

The invention also concerns a method which allows individual lighting devices, groups of lighting devices or arrays of lighting devices, as well as non-lighting devices to be individually controlled over large surface areas 1 m$^2$ to over 10,000 m$^2$ in accordance with the needs of the particular domestic or commercial system.

The invention also concerns a method for the control of wavelength, intensity and photoperiod of individual LED lights (LEDs) in commercial or domestic applications.

The invention also concerns the provision of automated control, digital collection and reporting of LED lighting and, where present, non-LED based devices within commercial and/or domestic systems, as well as for the monitoring and management of device-specific features in real-time and the use of feedback loops and evolutionary algorithms linked to pre-set conditions within the systems.

The invention also concerns means for providing LED lighting at 12-50 v AC for use in commercial or domestic applications, including commercial or domestic growth systems whilst assuring user safety and complying with health and safety electrical standards but not requiring an IP rating.

The invention also concerns a method which allows LED lights in a commercial or domestic growth system to be individually controlled for wavelength, intensity and photoperiod over large surface areas 1 m$^2$ to over 10,000 m$^2$ in a growing environment providing supplementary light or the only light in growth chambers or multilayer growing.

The present invention also relates to the spacing of LED lights in a commercial or domestic growth system to achieve optimum uniformity in close, suitable, proximity to a growing material for example plants.

The invention also concerns the safe adjustment of distance between the growing material and the lighting arrangement, in a commercial or domestic growth system for example between plants and LED lights.

The invention also concerns the provision of automated control, digital collection and reporting, as well as for the monitoring and management of wavelength, radiant intensity, photoperiod and other growth parameters in real-time and the use of feedback loops and evolutionary algorithms linked to the growth parameters and other conditions.

BACKGROUND TO THE INVENTION

Light-emitting diode (LED) lighting technology is known for delivery of increased power efficiency with associated reductions in cost in commercial applications, such as for example in street lighting where previously inefficient/high cost HID sodium lamps were utilised. One of the desirable features of LED fixtures is the ability to control each wavelength independently and to vary the intensities and the photoperiods according to the specific needs of the customised commercial or domestic system.

It is technically possible using LEDs to adjust the photoperiods from milliseconds to hours. LED lighting manufacturers have designed compact LED lighting arrays using conventional printed circuit boards (PCBs) often incorporating 100's of high powered LEDs. These are IP rated and supplied by high voltage, typically 240 v AC.

As over 50% of the power supplied to such LED arrays is typically converted to heat rather than radiant power, these compact LED lighting arrays are often air cooled with fans. Given the ever-increasing awareness of both domestic and commercial consumers of the environmental cost associated with wasted energy consumption, the relative inefficiency of the power conversion provided by commercially available LED arrays can be a deterrent to their use in some circumstances.

Thus, there is a need to provide a power system for such LED lighting arrays which converting more than 50% of the power supplied to radiant power rather than heat energy.

From a commercial perspective it would clearly be of considerable benefit if such LED array(s) could be operated on a more energy efficient basis, and in a cost-efficient manner whilst providing the capacity for remote control of their wavelength, radiant intensities and photoperiods.

Commercially available LED lights are powered with DC current which means that they are typically placed in close proximity to an AC/DC inverter, typically 230 v AC-24 v DC. At low voltage DC there is a significant voltage drop over short distances which mean that for system efficiency the AC/DC invertor must be placed at a distances from the LED lights of less than 5 m, and typically about 2 m.

A particular disadvantage of using LED-based lighting for the provision of lighting for large-scale commercial or industrial applications, or high intensity lighting systems which require high numbers of LED lights, is that the necessary spacing between either the individual LED lights or between groups of the LED lights means that the distance between the AC/DC inverters needs to increase because such arrangements typically mean that the risk of DC voltage drop is increased.

To date efforts to resolve this voltage drop issue for commercial applications have provided modified lighting systems which utilise LED lights, and particularly strips of LED lights, also known as strip lighting in association with an increased number of AC/DC inverters which are smaller in size. In addition to the LED costs indicated hereinbefore, and the additional inverter costs, such modified systems require far higher quantities of high voltage AC wiring, to connect to multiple inverters, than would be required if using a single large AC/DC inverter. This is particularly expensive in large scale commercial systems where all wiring and inverters must be IP rated. In addition, the complexity of such systems means that the measures required for controlling the LED lighting within such modified systems, as well as the measurement of wavelength, intensity and photoperiod generated becomes impractical as well as potentially hazardous should any fault occur.

Thus, there is a need to provide a system for the provision of power and lighting to LED-based lighting arrays which overcomes the voltage-drop restrictions of current systems and is capable of delivering radiant power distribution in a uniform manner, with improved power conversion versus the presently available conventional compact or strip style LED lighting arrays.

SUMMARY OF THE INVENTION

The present invention comprises a novel and improved power and lighting arrangement suitable for use in commercial and/or domestic applications. The invention particularly relates to a controllable system for the provision of power and lighting for commercial and/or domestic applications wherein the system comprises one or more LED lighting arrays and optionally one or more non-LED devices and wherein the lighting and devices are powered by low voltage power distributed on bus bars.

According to a first aspect the present invention provides an improved controllable power and lighting system suitable for commercial or domestic use wherein the lighting is an LED array comprising LED lights wherein the array is powered by an AC low voltage power supply and
  (i) wherein the low voltage AC power distributed to the array is linked to a main transformer which may be positioned externally or internally;
  (ii) wherein the low voltage AC power is distributed by bus bars;
  (iii) wherein the low voltage AC supplied to each LED light, or group of LED lights is converted to low voltage DC at an AC/DC rectifier associated with each LED light, or group of LED lights;
  (iv) wherein the system includes means for automatic control of the output of the LED array as a whole, or individual LED lights, or groups of LED lights within the array; and optionally
  (v) wherein the bus bars are adapted to power one or more non-LED based devices within the system.

According to a further aspect the present invention provides a novel power and lighting system suitable for commercial or domestic use comprising an LED array which comprises LED lights, wherein the LED array is powered by an AC low voltage power supply and
  (i) wherein the low voltage AC power distributed to the array is linked to an external main transformer,
  (ii) wherein the low voltage AC power is distributed by aluminium tubular bus bars,
  (iii) wherein the low voltage AC power supplied to each LED light, or group of LED lights is converted to low voltage DC at an AC/DC rectifier associated with each LED light or group of LED lights within the array,
  (iv) wherein the system includes means for automatic control of the output of the LED array as a whole or individual LED lights, or groups of LED lights within the array, and
  (v) wherein the LED lights comprise one or more LED spotlights, one or more LED floodlights, one or more LED strip lights, one or more strips containing one or more individual LED lights, or any combination of LED spotlights, LED floodlights, LED strip lights or LED containing strips.

According to another aspect the present invention provides a novel power and lighting system as defined herein wherein power line technology provided via the bus bars provides a control system for the lighting system, wherein the control system communicates with each individual LED light, or groups of one or more LED lights, or one or more arrays of LED lights via use of one or more LED-specific registration chips to provide a remote controlled and monitored system, and wherein automatic correction of voltage drop within the system is managed by local inverters associated with each LED, or group of LEDs within the array.

A further aspect provides a novel power and lighting system as defined hereinbefore having web-based remote-control features and means for the provision of power source blending between peak and off peak main power supplies, and also between a main power supply and alternative, renewable power supplies such as for example solar power.

According to yet further aspects the present invention provides a novel power and lighting system suitable for commercial or domestic use as defined hereinbefore wherein the system additionally comprises one or more of the following independent features, and any combination thereof: the lighting comprises LED strips; the lighting comprises LED spot lights; the lighting comprises LED floodlights; the lighting comprises a combination of LED spot lights, LED floodlights and/or LED strips; the combined power line and array registration enables wireless remote control and monitoring of the system; the system includes a feedback loop in the control system to enable real-time LED adjustment within buildings.

According to a still further aspect the present invention provides a novel power and lighting system suitable for commercial or domestic use as defined hereinbefore wherein each individual LED light, and/or non-LED device, or group of lights and/or non-LED devices, or array of lights and/or non-LED devices within the power and lighting system can be individually registered for control ultimately via the internet with all data collected via cloud internet with such control enabled by a power line communications chip.

According to another aspect the present invention provides an improved LED array for use with the present power and lighting systems for use in growth systems comprising a series of aluminium strips arranged in parallel wherein individual LED lights can be spaced at any distance along the length of each individual strip, wherein each individual strip is spaced at a similar distance from each individual adjacent strip and wherein the overall LED pattern provided by the LED array approximates to a uniform grid and wherein the LED strips are powered by an AC low voltage power supply.

There is also provided a power and lighting system suitable for commercial or domestic use comprising an LED array comprising LED lights wherein the array is powered by an AC low voltage power supply
  (i) wherein the low voltage AC power distributed to the array is linked to an external transformer;
  (ii) wherein the low voltage AC power is distributed by bus bars;
  (iii) wherein the low voltage AC supplied to each strip is converted to low voltage DC at an AC/DC rectifier associated with each strip; and (iv) wherein the system includes means for automatic control of the output of the LED array as a whole or individual LED lights, or groups of LED lights within the array.

These aspects and yet further aspects of the invention are described hereinafter.

BRIEF DESCRIPTION OF THE DRAWINGS

FIG. 2 illustrates two views of a concentric bus bar arrangement.

FIG. 3 illustrates how the power for the controllable power and lighting system in accordance with the present invention could be distributed in practise from a main power source, and in this example from the grid, via one or more transformers to a bus bar assembly within a building to provide power and lighting to LED lighting.

FIG. 7a provides an expanded view of the internal system within block (23a).

FIG. 18 provides illustrations of alternative arrangements of LEDs strips suitable for use in the controllable power and lighting systems for use in growth systems according to aspects of the present invention.

DETAILED DESCRIPTION

Advantages of the Invention

Figure 1B:
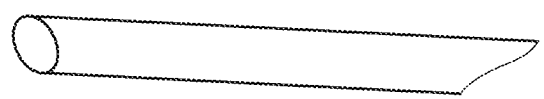
FIG. 1 illustrates a side-angled view of a section of three exemplary bus bars suitable for use in the controllable power and lighting systems of the present invention.

The Applicant has found that unprecedented efficiencies in terms of lighting and/or power costs are provided via use of the present power and lighting system comprising the use of aluminium bus bars and low voltage (<50 v AC) for power distribution to one or more LED arrays, and optionally one or more non-LED based devices.

In particular, the Applicant has found that bus bars at low voltage AC can be advantageously used to power LED lights, individually or in groups, within one or more LED arrays, and optionally one or more non-LED based devices within commercial and/or domestic applications buildings.

The Applicant has also found that 'power line' technology also referred to herein as power line technology, provided via the bus bars provides a desirable control system for the lighting system, wherein the control system communicates with each individual LED light/groups of one or more LED lights or one or more arrays of LED lights via use of one or more LED-specific registration chips for identification and control of individual lights or groups of lights to provide a remote controlled and monitored system, and wherein automatic correction of voltage drop within the system is managed by local inverters associated with each array.

Advantageously, use of the present improved power and lighting system removes the need for any high voltage AC supplies near the commercial or domestic environment in which the present power and lighting system is to be employed, and ideally removes any high voltage AC to a remote or external location. The combination of the desirable flexibility of lighting provided by the power and lighting system herein in conjunction with the unprecedented efficiencies in terms of lighting and/or power costs deliverable via the use of bus bars and low voltage (<50 v AC) for power distribution, and the attractive control system means that the present power and lighting system has manifold applications in both commercial and non-commercial/domestic applications.

In particular the Applicant has found that aluminium bus bars, at low voltage AC, can be used to power LED lights, individually or in groups, within one or more LED arrays within commercial and/or domestic applications buildings where 'power line' technology, provided via the bus bars, provides a control system for the lighting system, and wherein the control system communicates with each individual LED light/group or array via use of one or more registration chips for identification.

The Applicant has also recognised that the novel use of bus bars, at low voltage AC as detailed herein is useful for providing power to non-lighting specific devices in domestic and/or commercial applications.

Advantageously power line technology, combined with registration chips on each array, gives total remote-control and monitoring of either the lighting or the combined power and lighting systems herein. Such remote control not only has advantages in relation to the maintenance of power usage, it also enables the set-up of controllable domestic and/or commercial systems which can be tailored/pre-programmed to change during specified time-periods (minutes, hours, days, weeks, months) according to the particular needs of the user.

Further advantage of the web-based remote-control features of the power and lighting system for commercial and/or domestic applications herein is the ability to efficiently carry out power source blending between peak and off peak main power supplies, and also between a main power supply and alternative, renewable power supplies such as for example solar power.

Whilst the total number of LEDs within the system, and their arrangement within it will be dependent upon the needs of the particular commercial and/or domestic application, advantageously the combination of the present system and power line technology provides the ability to manage and control systems having 100,000 or more individual LEDs. The present system provides freedom in relation to the spacing of any of the LED lights as defined herein from one another as well as the relative positioning of groups of one or more LEDs from each other within the array.

An advantage of a lighting feedback loop is the ability of the system to react to external (non-LED array-associated) light levels such as for example light sensors and lighting needs such as for example motion sensors to provide optimal efficiency on an on-going basis.

Advantages of the non-LED device feedback loop is the ability of the system to react to local environmental factors such as for example motion sensors to provide power to non-lighting devices such as for example PCs, screens, and such like in low-activity areas effectively on demand.

The LED lights and non-LED based devices for use within the present system can be controlled independently using powerline technology, or using a wireless link to a local PC or via the internet remotely, or by using a combination of powerline and wireless technologies according the needs of the particular system to be controlled. To affect such control, each LED light, LED light fitting, or non-LED based device for use in the system is fitted with a registration chip which can be identified and controlled separately. Advantageously, the present system provides for the first time an effective "plug and play" system for complex power and lighting systems which can be designed and changed by the user in accordance with the desired commercial or domestic system to be accommodated and then the individual LEDs, or groups or LEDs, and one or more non-lighting devices can be registered and routinely calibrated as detailed hereinafter.

Exemplary arrangements for use of the present system for the provision of power and lighting in commercial and domestic applications are discussed hereinafter and illustrated by the Figures.

Definitions

For the avoidance of doubt the lights and devices which are controlled via the present power and lighting system include: LEDs as defined hereinafter, wherein said LEDs may be controlled independently, individually, in one or more groups, or as one or more independently controllable arrays; and non-lighting/non-LED specific devices as defined herein wherein said non-lighting/non-LED specific devices may be controlled independently, individually or in one or more groups.

An LED strip as defined herein is a linear strip which includes one or more LEDs arranged at equal spacing from one another and connected to one another by suitable wiring. For use in specified applications hereinafter, such as for example growth systems such LED strips are co-located with and adjoined to a suitable T-shaped host to enable ease-of-use within such systems. A strip-style LED array based on LED strips as defined herein means one or more connected strip style LED arrays which are subject to common control means. A strip style LED array as defined herein means one or more individual LED strips or groups of individual LED strips.

Non-LED based devices which may be controlled via the present power and lighting system are any non-lighting specific devices suitable for use in domestic and/or commercial applications. For the avoidance of doubt, any low-voltage compatible device may be powered via the presently proposed system via connection into the system via a device-specific registration chip and a local device-specific inverter/controller incorporated into the device lead with a suitable plug. For example, in exemplary domestic or commercial systems one or more devices such as laptops, personal computers (PCs), printers, scanners, dictation machines, telephone answering machines, chargers including mobile-phone chargers, tablet chargers, mobile gaming device chargers, camera and video chargers, TVs, monitors, shavers, hair trimmers, radios, smoke alarms/detectors, $CO_2$ alarms/detectors, security alarms and sensors and the like can be powered using the present system. Sound systems including either domestic surround sound or whole house systems, as well as large scale commercial sound systems are also suitable arrangements for power distribution to and remote control management thereof via the present bus bar arrangements and either power line or local/repeater wireless technology.

Domestic applications as defined herein are domestic buildings including: houses and outbuildings associated with houses, such as and including sheds, garages, outhouses, garden rooms, and domestic greenhouses and the like.

Commercial applications as defined herein include: industrial buildings; commercial buildings; premises adapted for or suitable for promotion of growth of living organisms including greenhouses and the like as detailed hereinafter; buildings including primarily offices/spaces for desk-based-work; buildings and/or warehouses suitable for material handling, and/or storage; factory or manufacturing buildings suitable for the preparation of goods; research facilities; hospitals; airport terminal buildings; and the like. As will be appreciated by the skilled person, any building where efficiencies in power and/or lighting are desirable can be adapted for use with the present system either in whole, or in part depending upon the requirements of the particular building.

Further commercial applications include: street lighting; floodlighting; lighting in parks and public spaces; car park lighting.

A remote location as defined herein means either a location which, although internal to the building, is at a remote location in relation to the lighting system, such as for example to a plant room, or the like.

Described hereinafter are features of the present system, and in particular a controllable power and lighting system for domestic and/or commercial utility including use of a busbar assembly of one or more busbars for the distribution of low voltage AC power, provided via one or more step down transformers, to a power and lighting system including LED lights, and optionally one or more non-LED based devices which utilises power line technology for the delivery of a communications gateway.

Bus Bars

The bus bars for use in the present systems employ a positive bus bar and a neutral bus bar running in conjunction with one another. The present systems can employ arrangements of positive and neutral bus bars which run in parallel with one another, which are non-parallel with one another, or where the bus bars are provided in a concentric arrangement. A segment of an exemplary parallel positive and neutral bus bar arrangement is discussed and illustrated in the Figures hereinafter. As detailed hereinafter in relation to particular LED lighting arrays in one arrangement the +/− electrical connections from the bus bars to the local rectifiers associated with each LED containing T-shaped strip are effected by any suitable means, and in particular by clips from the bar(s) to each strip.

Advantages of the bus bar arrangement versus present commercially available systems include: the use of transformers to effect an AC voltage reduction combined with local rectification/local voltage correction to provide a usable low voltage power and lighting system; efficiencies of from 90 to 94%; means for self-regulating system control; provision of automatic voltage correction; ability to control arrays containing more than 100,000 LEDs via use of power line technology; more efficient wiring system with only final wiring being required, and being provided via copper wire; provision of a "plug and play" LED array; use of wireless link(s) to local sensors within the system as part of the management and remote-control of features within the array(s); and the ability to carry large currents at low AC voltages over long distances.

In addition, as such systems provide unprecedented efficiencies in running costs, versus current 24/7 monitored systems, as well as being less capital intensive to set-up, typically in the region of 30% cheaper, the present growth system provides for the first time a reliable, efficient, controllable and sensitive LED array for use in close proximity to living organisms.

In commercial and/or domestic applications employing the present system the power is initially provided from the transformer into a main bus bar system comprising one or more main bus bars, and thereafter to one or more secondary bus bars, and optionally onto one or more tertiary bus bars. For the avoidance of doubt, and as explained hereinbefore the bus bars as utilised herein can employ arrangements of positive and neutral bus bars which run in parallel with one another, which are non-parallel with one another, or where the bus bars are provided in a concentric arrangement. The Applicant has found that for efficient system design, bus bar assemblies employing a positive bus bar and a neutral bus bar running in parallel with one another are of particular use. This feature is discussed and illustrated in the Figures hereinafter.

In such systems a main bus bar system comprising one or more main bus bars means one or more positive and neutral bus bars running in parallel with one another and where the bus bars are connected to one another, or are joined to for example secondary bus bars, or where one or other of the bus bars is shaped or bent in order to be suitably located into the commercial or domestic location then said bus bars may be non-parallel with one another at such joins, bends or otherwise shaped sections.

Thus the present application provides a power and lighting system for commercial and/or domestic applications as defined hereinbefore wherein the power is distributed via a bus bar assembly comprising a main bus bar system comprising one or more main bus bars, and thereafter to one or more secondary bus bars, and optionally onto one or more tertiary bus bars.

Any suitable bus bars, also known as busbars, buss bars, or bussbars made of conductive material, and in particular metals such as aluminium, copper or brass may be used in the present bus bar assembly. The bus bars for use in the commercial and/or domestic arrangements herein include; tubular bus bars; aluminium tubular bus bars; copper tubular bus bars and combinations thereof. The present systems may employ different bus bars for each of the main, secondary and tertiary bus bar arrangements, or the same material for each, or any other combination of suitable bus bar materials according to the requirements of the particular power and lighting system.

Thus, according to a further aspect the present invention additionally comprises a system as defined herein having conductive bus bars which are made of Al or Cu or a mixture thereof. For the avoidance of doubt, this includes systems having main, secondary and optionally tertiary bus bars wherein each of the main, secondary and optionally tertiary bus bars assemblies independently comprises Al or Cu bus bars.

Whilst any suitable shape of such bus bars including tubular, square or alternative shape(s) as desired may be used the Applicant has found that for optimal results tubular or substantially tubular bus bars are preferred. Tubular bus bars are essentially circular in cross-section and are hollow internally. Tubular or substantially tubular bus bars having any wall thickness and/or diameter are suitable for use herein. Where the term tubular is used hereinafter this means tubular and/or substantially tubular unless specified otherwise. The external surface of the bus bar may be solid, or may include holes or pits or indents. Various different bus bar shapes are discussed and illustrated in the Figures herein. For the avoidance of doubt the selection of a suitable bus bar, and in particular the wall thickness and/or diameter of the bus bars will be dependent upon the requirements of the particular part of the commercial and/or domestic power and lighting system in which it is to be employed, either from the viewpoint of providing the necessary levels of support for the LED array(s) where required, or for the provision of optimal cost per meter of the particular power loading being provided to and distributed by the bus bar system. As such metal bus bars, including Al and/or Cu bus bars, for use herein can be designed to have large diameters and small wall thicknesses or small diameters and larger wall thicknesses to achieve optimum cost per meter for each power loading (current). The selection of Al and/or Cu bus bars for use in a bus bar assembly or in any portion of a bus bar assembly will be dependent upon the requirements of the particular system, whilst Cu is an especially efficient conductor, Al is lighter and can be more cost-effective which can provide more design flexibility.

Without wishing to be bound to any particular theory it is proposed herein that metal bus bars, particularly Al and/or Cu bus bars, and especially tubular or substantially tubular Al and/or Cu bus bars for use in bus bar assemblies herein having large diameters and small wall thicknesses are preferable for use herein because use of such bus bars with alternating current (AC) provides desirable skin effect properties versus those found for bus bars of small diameters and larger wall thicknesses. It is proposed that use of the preferred bus bars for distribution of low voltage AC power achieves a higher current density between the outer surface of the bus bar and the skin depth of the bus bar than would be provided by bus bars having larger wall thicknesses and smaller diameters. Commercially available tubular bus bars of any suitable diameter and width can be used. Exemplary bus bars for use as the main, or primary, bus bars in the power and lighting systems herein are tubular aluminium bus bars. Suitable aluminium bus bars for use herein are commercially available hollow tubular aluminium bus bars, including tubular aluminium bus bars available from Alcomet in a range of outside diameters of from 25 mm up to 250 mm.

Commercially available copper tubular or substantially tubular bus bars may be utilised in the present systems, either as hollow tubular or substantially tubular copper bus bars. Optionally copper wires can be connected to the present bus bar assemblies and are particularly suitable for use as pseudo-tertiary bus bars in the present systems. Use of copper bus bars in the present bus bar assemblies, tubes and/or as wires, advantageously allows for ease of positioning of the LED lights in their selected spots. For the avoidance of doubt, and as discussed hereinafter where copper wires are utilised this is at points in the system where the distances are very small and the currents are very low and the wire merely distributes the power at a tertiary level i.e. directly to an LED light or such like.

For the avoidance of doubt, where the PCB is connected directly to the bus bar, such as for example via utility of the T-shaped strips detailed hereinafter in relation to use of the present power and lighting system for control of LED arrays the use of copper wires to effect the connections to the individual LEDs is not necessary.

In many commercial and/or domestic buildings, the main bus bars typically having a vertical or substantially vertical arrangement and can be located externally, internally or centrally. This feature is illustrated in the Figures hereinafter. From these main bus bars the power can then be distributed to lighting arrays throughout the system via a secondary bus bar system comprising a series of secondary bus bars, or optionally wires at each floor or level of the building having a horizontal or substantially horizontal arrangement. The tertiary power supply system comprises a series of tertiary bus bars, or optionally copper wires at low voltage AC at each floor or level of the building having a horizontal or substantially horizontal arrangement.

As will be readily appreciated the present system provides for desirable flexibility in design of the bus bar assemblies for domestic and/or commercial applications, with the relative arrangements of the main, secondary and tertiary bus bar systems providing the ability to build-in bespoke power and lighting systems which are cost-effective, efficient and controllable. In general, the size of the bus bars (diameter) is reduced between the main and secondary system, and again between the secondary and tertiary system. This feature is illustrated and discussed further in the Figures.

Typically the power for the LED lighting is distributed by the secondary bus bar arrangement and as such in the majority of cases this arrangement will be located towards the ceiling or roof of the room, or office, or warehouse or other section of the domestic and/or commercial building, although the system does include the capacity for the lighting to be provided from bus bars connected to walls, or other structures to provide lighting from alternative perspectives than simple downward arrangements. Where the system requires, the secondary bus bar arrangement may be linked to a tertiary bus bar arrangement to further distribute power to the lighting.

The tertiary bus bars or optionally copper wiring at low voltage further distributes the power from the secondary bus bars to the LEDs, as detailed hereinbefore as well as to non-LED devices (where present) as also defined hereinbefore. Again, for the non-LED devices the design freedom provided by the present system allows these bus bars to be located according to the bespoke needs of the building users, but most commonly, tertiary bus bars provided for power distribution to non-LED devices will be located at, or close to, the floor at each level of the commercial and/or domestic building within which the system is employed. For certain rooms, such as kitchens the tertiary system may be advantageously located above workbench/kitchen unit height.

According to a further aspect the power and lighting systems as detailed hereinbefore may additionally comprise a coated bus bar assembly wherein the coated positive and neutral bus bar components of each of the main and secondary bus bars run in parallel to one another, or are non-parallel to one another, or are in concentric arrangement with one another and wherein the main bus bars are provided in a substantially vertical arrangement and wherein the secondary bus bars are provided in a substantially horizontal arrangement.

Suitable bus bars for use herein include coated bus bars, and more particularly plastic coated bus bars. Any suitable commercially available plastic coating material suitable for use on bus bars, and in particular coatings suitable for use with Al or Cu busbars may be utilised. For electrical and heat insulation the bus bars for use in the present systems can be protected with any suitable commercially available insulating materials, such as for example heat shrink coatings. Suitable heat shrink bus bar tubing for use herein includes BBIT heat-shrinkable bus bar tubing from Raychem. A section of a coated bus bar is illustrated in the Figures herein.

In systems where the main transformer is externally located and the main bus bar system is either fully or partially externally located then the main bus bar is optionally further coated with a suitable thermal insulation/environmental protective layer. Any suitable commercially available thermal and/or environmentally protective material suitable for use on bus bars, and in particular thermal and/or environmentally protective materials suitable for use with Al or Cu busbars may be utilised.

Where one bus bar system is to be connected to another bus bar system within a bus bar assembly for use in the present power and lighting system, for example to make a connection from the secondary bus bars to the main bus bars, the connection may be effected by baring the plastic at the desired connection point of the main bus bar to expose the metal and connecting to a correspondingly exposed metal aspect of the secondary bus bar thereto. Where an electrical connection is to be effected, such as for final wiring of the low voltage wiring (which is connected to the LED light(s), LED strip(s), or strips containing one or more LED lights) to the secondary, or tertiary, bus bars, then a connection point may be drilled into the secondary, or tertiary, bus bar. For the avoidance of doubt, where the main bus bar system is either fully or partially externally located, then connection to the secondary system may be effected as designed hereinbefore.

Power Line Communications Functionality

As detailed hereinbefore the invention provides a controllable power and lighting system including an LED array having communications functionality.

Power line technology provides the ability to include communications functionality on top of an existing AC supply waveform. Thus in addition to the advantages and benefits of the power and lighting systems for LEDs and non-LED devices as detailed herein, the invention provides as a further aspect a power and lighting system as detailed herein having communications functionality.

Power line technology, also known as power-line communication (PLC), power-line carrier, power-line digital subscriber line (PDSL), mains communication, power-line telecommunications or power-line networking (PLN). For the avoidance of doubt, and in accordance with one or more aspects herein the present systems provide communications technology via PLC over a low voltage AC bus bar assembly. In the present power and lighting systems the combination of the power line technology with the bus bars provides means for simultaneous carrying of data on the bus bar assembly as well as providing distribution means for the low voltage AC power.

In addition to the desirable controllable, low cost, high efficiency benefits provided by the present power and lighting systems, the utilisation of power line technology provides the ability to build-into such systems unique identifying information and the ability to drive-down installation and running efficiency costs yet further. Thus, according to a preferred aspect there is provided a controllable power and lighting arrangement for commercial and/or domestic use comprising an LED array comprising LED lights wherein the array is powered by an AC low voltage power supply and
(i) wherein the low voltage AC power distributed to the array is linked to a main transformer which may be positioned externally or internally;
(ii) wherein the low voltage AC power is distributed by bus bars; wherein the low voltage AC supplied to each LED light, or group of LED lights is converted to low voltage DC at an AC/DC rectifier associated with each LED light, or group of LED lights;
(iii) wherein the system includes means for automatic control of the output of the LED array as a whole or individual LED lights, or groups of LED lights within the array;
(iv) wherein the bus bars are adapted to power one or more non-LED based devices within the system;
(v) and wherein the system additionally comprises power line technology in combination with communications, and registration means within the array, and the non-LED based devices and wherein the system can be monitored and controlled remotely.

Advantages of the present controllable power and/or lighting system which additionally includes power line technology versus present commercially available systems include: the use of transformers to effect an AC voltage reduction combined with local rectification/local voltage correction to provide a usable low voltage power and lighting system; efficiencies of from 90 to 94%; means for self-regulating system control; provision of automatic voltage correction; ability to control arrays containing more than 100,000 LEDs via use of power line technology; more efficient wiring system with only final wiring being required, and being provided via copper wire; provision of a "plug and play" LED array; as well as the potential use of wireless link(s) to local sensors within the system as part of the management and remote-control of features within the array(s).

The potential use of a combination of powerline technology and wireless technology (Wi-Fi) is discussed hereinafter.

In addition, as such controllable systems including bus bars, step-down AC transformers, low voltage AC power distribution and power line technology as detailed herein, provide unprecedented efficiencies in running costs, versus current 24/7 monitored systems, as well as being less capital intensive to set-up, typically in the region of 30% cheaper, the present power and/or lighting system provides for the first time means to deliver bespoke LED lighting, and/or power to non-LED devices (where present) in commercial and/or domestic applications via a system which is reliable, efficient, sensitive and remotely-controllable.

According to a further aspect the power and lighting system of the invention provides means for independent control of the wavelength intensity and photoperiod of each LED light, or groups of LEDs, within the one or more LED arrays used in the present systems over large areas 1 m$^2$ to 10,000 m$^2$. By registering the LEDs or groups of LEDs upon installation, or periodically thereafter, the radiant power of the overall system, individual LED lights, groups of LED lights, LED strips or groups of LED strips, or one or more LED arrays within the system over a range of input currents is known.

Each registered LED can be recalibrated using a spectroradiometer as required. This process allows for repeatability and data logging of the radiant power delivered by the lighting aspect of the present system to be measured, and for the first time provides information in real-time as to the radiant power being delivered to the users, either across the system, or within individual sections, segments, offices, floors, factory lines, or other such pre-determinable sectors of the system wherein these individual areas within the system are aligned to corresponding LEDs or groups of LEDs within the one or more LED arrays as defined herein before and as utilised in the present power and lighting system.

Thus, according to a yet further aspect the present invention provides a control system for LED lighting devices, and non-lighting/non-LED based devices within the system as defined herein wherein the control system includes means for logging of data for measurement of radiant power and wherein the non-lighting/non-LED based device control system includes means for logging of data for measurement of power consumption.

The present control system for the power and lighting system for LED lighting and non-LED based devices as defined herein uses smart software to manage the data being captured and relayed to the control system from various sources including: lighting registration chips; rectifier control means; power line communications chip; wireless technology; local PCs; other data capture means; or mixtures and combinations thereof in order to provide tailored monitoring and control of the system as a whole.

Each LED light, group of lights, LED strip, group of LED strips, strip containing one or more LED lights, or group of strips containing one or more LED lights, within a lighting array or non-LED based device, or group of non-LED based devices, or a combination of LED and non-LED based devices for use in the present controllable power and lighting systems can be controlled independently using powerline technology as detailed herein, or where the demands of the system require such functionality control may be effected by a combination of powerline and wireless technology, or via stand-alone wireless technology using a wireless link to a local PC or via the internet remotely. To affect such control, each LED light or group of LED lights, within an array, or each non-LED based device or group of such devices is fitted with a registration chip which can be identified and controlled separately.

As detailed herein after the Applicant has also found that in addition to power line technology the present controllable power and lighting system comprising low voltage AC distributed via bus bars to one or more LED arrays, and one or more non-LED based devices (where present), wherein the array(s) and/or devices have local registration chips is highly compatible with local/repeater wireless technology. For power and lighting systems herein which require the capacity to deliver significant/strong wireless signal strength, such as for example in applications where internet access is required, or where portability of smart devices for use within the system is required local/repeater wireless technology can be advantageously employed.

Transformers

Suitable transformers for use in the present systems are 240-50 v AC RMS transformers. As will be appreciated such a transformer can be sized to supply either a single building or a series of buildings, or a series of sections within a single building to provide capacity of thousands of meters square. For safety reasons such transformers are generally located externally. To optimise system efficiency larger transformers are preferred, and as such when a new power and lighting system for a commercial or domestic application is being designed the current and future capacities should be considered to ensure that the system is designed to deliver both initial and on-going efficiency. In general, larger transformers provide greater the efficiency, typically in the region of 95-99% or more.

The present power and lighting system provides LED lighting for commercial and/or domestic applications wherein the LED lighting arrangement has electrical and radiant efficiency benefits versus conventional systems as well as power for non-LED based devices where present.

The present system can provide electrical efficiencies in the region of: greater than about 80%; greater than about 85%; about 87% in combination with radiant efficiencies (wall plug efficiencies), for LED and non-LED based devices in electrical connection with the system, in the region of: greater than about 30%; greater than about 35%; greater than about 40%; about 43%.

The present systems utilise 240 v AC to 24/50 v AC transformers which can be up to 99% efficient at large scale, in combination with local rectifiers/local voltage correction device (two steps) associated with each LED light, or group of LED lights, or with each non-LED based device (where present). Such rectifiers can be selected for optimal efficiency levels, and ideally in the region of about 95% efficient. By use of the present control system having 95% efficiency the present system is capable of providing electrical efficiencies in the region of 87% (99%×95%×95%), which corresponds to about 43% wall plug efficiency (50%× 87%), in an example where the LED is 50% radiant efficient.

Thus, according to a further aspect the present invention provides a controllable power and lighting system as defined herein which includes LED lighting, and utilises 240 v AC to 24/50 v AC transformers in combination with local rectifiers/local voltage correction device associated with each LED light, or group of LED lights, or with each non-LED based device (where present).

Representations of domestic and commercial systems system utilising this efficient power and lighting system are illustrated by the Figures herein.

To accommodate commercial systems such as for examples warehouses having very large footprints of thousands of meters square, the Applicants have designed a modified system wherein the main large transformer can be installed at a remote point inside the warehouse with power being distributed to the lighting array and any non-LED devices as desired via the bus bar assembly and having the remote control features as defined herein. Only the internal cabling to the transformer would need to be IP rated with the remainder of the system being as defined hereinbefore.

For the avoidance of doubt, in the present power and lighting systems for commercial and/or domestic applications the main AC transformer can be located internally or externally. Where the present system is incorporated into a commercial and/or domestic building having one or more AC transformers, the main AC transformer can be located externally, at a central location to the system, or internally either centrally, or at the top or at the bottom of the building according to the particular building requirements. A central location as defined herein includes: a position central to the system; a plant room; a central plant room; a position central to a group of rooms, floors, offices, or buildings and the like which are powered by the present power and lighting system.

Thus the invention additionally provides a power and lighting system suitable for use in commercial and/or domestic applications in accordance with any of the aspects detailed herein comprising an external or internal main AC transformer, wherein when the main AC transformer is internal to the building it may be positioned centrally or at the top or at the bottom of the building, and wherein when the main AC transformer is external it is positioned at a central location.

Electrical Power Surge Protection on High Voltage Side of Transformer

According to a further aspect the present invention provides a novel lighting system suitable for commercial or domestic use as defined hereinbefore wherein the system additionally provides means for protecting the lighting arrangements in systems from electrical power surges via the use of transformer related surge protection equipment on the high voltage side of the transformer. Any suitable surge protection equipment, also known as surge protection devices, surge suppression devices, or transient voltage surge suppression equipment capable of protecting against surges or spikes in the low voltage AC being supplied from the transformer into the system can be used. As will be appreciated the selection of any particular surge protection equipment will be dependent upon the particular low voltage AC level being supplied to any particular system in accordance with the present invention.

Thus the present invention provides a novel lighting system suitable for commercial or domestic use in accordance with any of the aspects defined herein wherein the system additionally comprises means for protecting the lighting arrangements in systems from electrical power surges.

Watch Dog Surge Protection on Low Voltage Side of Transformer

According to a further aspect the present invention provides additional means for protecting the controllable power and lighting arrangements in systems having bus bars against electrical surges. In addition to the transformer related surge protection equipment on the high voltage side of the transformer as detailed hereinbefore, the system additionally comprises watchdog-type technology, as defined herein, on the low voltage side of the transformer which compares the actual power being used on each bus bar to that predicted by the software. Variances from the pre-set levels can be incorporated into the control system to show as an alarm and any pre-set large variances can be configured to trip the power to the particular bus bar, or group of bus bars which are out of compliance with the pre-set power distribution levels in order to protect the overall system.

Watchdog-type technology as defined herein means equipment which is both compatible with the control system being operated for any particular system herein and which is capable of monitoring power consumption and distribution levels at one or more point within the power distribution apparatus (bus bars/wiring) of the present systems in real time. Any suitable monitoring equipment such as a power meter can be used.

As a further feature suitable conventional fuses can also be installed to provide an additional safety measure should the power levels being distributed to any particular bus-bar, or group of bus bars within the system exceed a predetermined level. For the avoidance of doubt such predetermined level may vary depending upon the nature of the specific system, and the relevant breaking capacity/interruption rating of the particular fuse selected for use.

Thus the present invention provides a novel lighting system suitable for commercial or domestic use in accordance with any of the aspects defined herein wherein the system additionally comprises provides means for protecting the lighting arrangements in systems from electrical power surges wherein said means comprises the combined use of surge protection equipment, watchdog timer equipment and optionally one or more fuses.

Power Supply and Control Functions for LEDs and Non-LEDs

As detailed hereinbefore, the applicant has found that tubular, or substantially tubular aluminium bus bars, at low voltage AC, can be advantageously used to power complex power and lighting systems comprising LED lights, individually or in groups, within one or more LED arrays optionally in combination with one or more non-LED based devices, within commercial and/or domestic applications where 'power line' technology, provided via the bus bars, provides a control system for the lighting devices and the optional non-lighting devices within the system, and wherein the control system communicates with each individual LED light, or non-LED based device (where present), or groups thereof, or array(s) of LEDs lights via use of one or more registration chips for identification.

Any LED array which has been made to link to the low voltage AC via a registration chip can be utilised in the power and lighting systems herein for commercial and/or domestic applications. The means by which such LED array(s) may be registered are as detailed herein.

For non-lighting devices, such as for example a mobile phone charger, the charger plug is connected to the low voltage AC supply which is converted to DC by a suitable inverter which can be incorporated into either the device lead or into the charger plug. Each non-lighting device can be monitored and/or controlled independently using a wireless link to a local PC or via the internet remotely via the combination of a local individual controller containing a suitable pre-registered chip, which is incorporated into either the device lead or into the charger plug.

For the avoidance of doubt, any commercially available wireless technology which provides a Wi-Fi facility whereby a non-LED based device, such as for examples a computer, tablet or smart form or the like is able to connect to the internet or connect wirelessly to another non-LED based device within a defined area i.e. within the system may be utilised.

As detailed hereinafter the LED lights are powered by low voltage AC, as distributed and supplied by a bus bar assembly. The low voltage AC is converted to DC on each LED light, or each LED light fitting, at the end of each strip by using an appropriate rectifier. Each LED light, or groups of LED lights within the array(s) can be monitored and/or controlled independently.

As detailed herein powerline technology, associated with the bus bar assembly, is advantageously employed to provide control of the system. Representations of power and lighting systems incorporating powerline technology are discussed and illustrated in the Figures.

Wi-Fi/Li-Fi

Further and/or alternative control system features such as the use of a wireless link to a local PC or via the internet remotely are detailed hereinafter.

According to a further aspect each LED light, or non-LED device herein, including individual LEDs strips, groups of LEDs within an array, one or more arrays of LEDs, individual non-lighting device, or a group of non-lighting devices can be individually controlled ultimately via the internet with all data collected via the cloud.

Such control is provided by a local PC linked to a central microcontroller which is wireless enabled. For example, each LED strip, or more typically each group of LED strips, or one LED within a group of linked LEDs, receives the wireless signal and distributes the command to each individual LED within the strip or group of LED strips, or each LED within a group of linked LEDs, via a series of low voltage control wires which link the strips together. These same control wires and wireless signals are two-directional and are able to send commands and collect data from local sensors and other monitoring equipment.

Further advantages of the controllable, low cost, high efficiency, power and lighting systems of the present invention comprising LED lighting and non-LED devices are the ability to build-into such systems unique identifying information and the ability to drive-down installation and running efficiency costs yet further via the utilisation of a combination of Wi-Fi and power line technology.

For LEDs in particular, such local controllers are able to vary the voltage and current from zero to typically 200% of the LEDs design specification where 100% is the optimum or 'sweet spot' where the ratio of radiant power to electrical power is at its maximum. Current boost above the 'sweet spot' can be beneficial where 'off peak' power costs are available. The microcontrollers can also pulse in order to control light intensity and photoperiod by pulse wave modulation (PWM). They can also vary the voltage, current and pulse simultaneously.

As discussed hereinbefore, in relation to LEDs, to enable advantageous lighting system control each LED, group or strip of LEDs is fitted with a registration chip which can be identified and controlled separately. On installation each LED, group or strip of LEDs is calibrated over the range of input currents and 'on-off' pulse widths using a purpose designed spectrometer or spectroradiometer thus enabling the control system to deliver and record the wavelengths, intensities and photoperiods delivered by each strip. This enables the manufacturers of LED bin selections to be corrected to compensate for LED production variances. It also enables many more bins of LEDs to be bought thus reducing cost. Over time the LEDs deteriorate and require more electrical power for the same radiant output power. By periodically recalibrating these variances become known and can be adjusted for. Further by collecting the input power data over time (years) the deterioration can be predicted and strip replacement can be optimised. The calibration also allows for faults to be identified and early replacement undertaken. The calibration process also allows for automated LED cleaning with associated benefits for system efficiency as well as ancillary cost-savings for physical cleaning.

LED calibration may be carried out on manufacture, on installation into a system, or as required during the life-cycle of an LED, such as for example on fixing an LED light or LED light fitting into an array. For optimal control efficiency an LED for use in the present system should be calibrated before it is registered. Any suitable calibration process may be used to calibrate LEDs for use in the present systems prior to their registration and utility. In an exemplary LED calibration process suitable for use herein the following steps are carried out:

1. Each LED, or if all the LEDs within a group of LEDs within the array are identical, then one LED from each group by bin, would be manually connected to the AC low voltage supply via an appropriate bus bar or wire and inserted into a 'dark box';
2. A pre-set combination of currents and PWM sequences would be run and the resultant data would be logged as relating to all the LEDs used in the system from that bin. Where there are more complex systems containing different groups of LEDs and/or LEDs from different bins, then steps 1 and 2 would be repeated in respect of each differently sourced LED;
3. The relevant resultant data-set would be allocated to the registration chip for each group of LEDs within the array which contains the LEDs from the logged bin number; and
4. Once the system is up and running with the calibrated, registered LEDs then, in the future when any of these combinations are used the data will be known and can be mapped for the areas within the building/array under each LED or group of LEDs.

As detailed hereinbefore the LED lights for use here are ideally calibrated and registered prior to the array being operated. Each LED has a 'serial identifier chip' to provide serial registration which means that the LED calibration information would be stored against this unique number.

Data Management/Security

As discussed hereinbefore, according to a yet further aspect the present invention provides a controllable power and lighting system for LED lighting devices and non-LED lighting based devices within the system as defined herein wherein the lighting control system includes means for logging of data for measurement of radiant power and wherein the non-lighting control system includes means for logging of data for measurement of power consumption.

As also discussed hereinbefore whilst the total number of LEDs within the system, and their arrangement within it will be dependent upon the needs of the particular commercial and/or domestic application, advantageously the combination of the present system and power line technology provides for the first time the ability to manage and individually control LEDs in systems having 100,000 or more individual LEDs.

A particular advantage of the present controllable power and lighting system for LED devices and non-LED based devices in commercial and/or domestic applications having up to 100,000 or more individual LEDs and comprising low voltage AC power distributed via bus bars in combination with automated control of said devices via powerline technology in accordance with any of the aspects detailed herein is the provision of unprecedented levels of security.

For the LED lighting system for use in the controllable power and lighting system of the present invention, advantageously the lighting control system includes means for logging of data for measurement of the radiant power of the LED array as a whole, or individual LEDs, or groups of LEDs within the array without continuous spectroradiometry.

Thus by linking the LED array control system to movement sensors and light sensors an overall control system providing real-time or periodic data-sets which enable progressive/on-going of optimisation and/or maintenance of pre-defined output levels within the system can be achieved.

Thus according to a further aspect the present invention provides a controllable power and lighting system for providing effective light levels to a commercial or domestic system via an LED array as defined herein before and wherein it is a feature of said control system that there is no need for on-going measurements of the LED wavelengths, intensities or photo periods.

According to a yet further aspect said control system can be linked to a natural light meter to enable the controls to adjust the LEDs as light levels change within the commercial or domestic environment. A particular feature of the power and lighting systems herein is the ability to power the LEDs at a voltage that is safe for operatives/maintenance personnel. This is achieved by connecting the lighting system to an AC low voltage power supply, between 12-50 v AC, typically 24-36 v AC which is provided to the system via bus bars. A further safety advantage provided by the present controllable power and lighting system versus those currently available is that once installed operatives responsible for day-to-day maintenance of the building can safely install and maintain all the LEDs, because they are operating at only low voltage AC. This leads to commercial operating cost reductions. The overall efficiency of the LED array can be controlled to maintain operational voltages which optimise the rectification. Thus according to a further aspect there is provided herein a control system for use in a power and lighting system comprising one or more LED arrays and one more non-LED devices as defined herein wherein the control system includes means for logging of data for: measurement of: the radiant power of the LED array as a whole, or individual LEDs, or groups of LEDs within the array; measurement of light levels within the building, or section or floor of the building in which the power and lighting system is employed via light sensors; measurement of power levels to one or more, LEDS, groups of LEDs within the array, and/or individual or groups of non-LED devices within the power and lighting system and wherein said control system provides means for control of the operational voltages to maintain efficiency of 90% or above.

One Gateway

As discussed hereinbefore the present invention additionally provides means for independent control of each individual device within the power or lighting system, wherein said individual device is an LED device or a non-LED based device, as well as means for selective control of group of LEDs or groups of non-LED based devices, or arrays of LEDs within the power and lighting system. As will be appreciated such lighting systems may contain LEDs of different wavelengths. This is achieved with low voltage control lines, power line technology or wireless technology, or a combination of both power line and wireless technology commanded by a central microcontroller.

This microcontroller also acts as a common gateway for traditional Personal Computer (PC) communications. This data can be arranged to vary the intensity or radiant power at each wavelength and photoperiod of any one of, or any combination of LEDs within the controllable power and lighting system either by varying the current or by incorporating pulse width modification (PWM).

The method of communications between this common gateway (microcontroller) and the PC can be through hard wired means serial or Ethernet etc., or wireless, via Wi-Fi, snap, Zigbee, Xbee or other wireless protocols.

In particular the use of a combination of powerline technology with a central microcontroller to provide the central gateway in the control system for the controllable power and lighting systems herein is especially advantageous from a data security perspective, particularly when compared with currently available wireless-based systems.

Use of the present powerline and central microcomputer based system channels all the data from the 1000's or tens of 1000's of LED and/or non-LED based devices in the present controllable power and lighting systems via a single, common gateway which is appreciably more secure than using a series of 1000's or tens of 1000's of individual wireless links which would be required using currently available wireless-based technology.

In addition to this beneficial data-security aspect, the use of dual system combining a single microprocessor as a common gateway and powerline technology of the bus bar assembly provides a system which is easier to maintain and update than one having potentially 1000's of different Wi-Fi channels. An illustration and detail relating to the utility of gateway technology is provided in the Figures There are some non-LED based devices which require the facility for mobile connectivity throughout a system, such as for example portable devices having smart technology, mobile phones, laptops, tablets and the like. Bespoke control functionality for such non-LED based devices which require a facility for mobile connectivity can be enabled via use of a local Wi-Fi generator to enable wireless connectivity to/data transmission to/from the mobile device(s) connect to the device using radio frequency wireless signals wherein the Wi-Fi generator is fed by power line technology, or alternatively via use of Li-Fi from specified LEDs to enable wireless connectivity to/enable data transmission to/from the mobile device(s) using wireless optical networking technology using visible light communication (VLC) means wherein the specified LEDs are fed by powerline technology.

Accordingly there is provided herein a controllable power and lighting system having means for independent control of each individual device within the power or lighting system, wherein said individual device is an LED device or a non-LED based device, as well as means for selective control of group of LEDs, or groups of non-LED based devices, or arrays of LEDs within the power and lighting system via use of low voltage AC distributed via bus bars as defined in accordance with any of the aspects hereinbefore and an automated control system comprising power line technology and wireless technology commanded by a central microcontroller.

According to a further aspect there is provided a controllable power and lighting system having means for independent control of each individual device within the power or lighting system, wherein said individual device is an LED device or a non-LED based device, as well as means for selective control of group of LEDs, or groups of non-LED based devices, or arrays of LEDs within the power and lighting system via use of low voltage AC distributed via bus bars as defined in accordance with any of the aspects hereinbefore and an automated control system comprising power line technology and wireless technology commanded by a central microcontroller and wherein said wireless technology is independently selected from: Wi-Fi; Li-Fi; a combination of Wi-Fi and Li-Fi.

For enhanced data security in controllable power and lighting systems herein which require wireless connectivity to non-LED based devices which require mobile networking functionality there is provided a system as defined hereinbefore system having means for independent control of each individual device within the power or lighting system, wherein said individual device is an LED device or a non-LED based device, as well as means for selective control of group of LEDs, or groups of non-LED based devices, or arrays of LEDs within the power and lighting system via use of low voltage AC distributed via bus bars as defined in accordance with any of the aspects hereinbefore and an automated control system comprising power line technology and wireless technology commanded by a central microcontroller and wherein said wireless technology comprises means for providing a Li-Fi wireless connection from the system to one or more non-LED based devices and a Wi-Fi wireless connection from the one or more non-LED based devices to the system.

A control system for non-LED based mobile devices for which the control system includes Wi-Fi and Li-Fi connectivity as well as LED lighting controlled via powerline is illustrated and discussed in the Figures.

For the avoidance of doubt, this is for the transmission of data and control functions. Where there is communication between the device and the system, this is for the transmission of control functions and/or data and where there is a communication between the system and a device is for the transmission of control functions and/or data. In one embodiment a Wi-Fi/Li-Fi system is employed where the transmission if one-way for the device and another way for the system.

The ability to control the intensity and the photoperiod of each wavelength to each individual LED, to groups of LEDs, to each LED strip or group of strips, or one or more specified LED arrays within the overall array allows for feedback loops to vary the LEDs according to the ambient light conditions in a pre-determined area of the commercial or domestic system in which the present controllable power and lighting system is employed. Such pre-determined area can be an entire building, one or more rooms or floors, or sections, or areas or spaces within a building such as for example, corridors, and stairwells within a building, groups of rooms or spaces, or one of more floors, or any other arrangement as desired. This allows for the optimum use of lighting-related power by optimising the LED photon production.

An optimisation process can be employed once the system has been installed and the building is in use, such an evolutionary optimisation process would enable lighting needs across a specified period (minutes, hours, days, weeks, months) to be assessed by the use of light and/or movement sensors with the resultant data being collected via the control system. Processing of this data would provide the base-line pre-set lighting levels across the specified period which can then be monitored and controlled for on-going efficient light level delivery by linkage of the control system to imaging and light sensing equipment allowing feed-back loops to control the light in real time.

LEDs

An LED is a light emitting diode and any suitable LED may be utilised in the lighting arrays for use in the present power and lighting systems. Typically, the LEDs for use in any particular commercial or domestic system are selected for their ability to provide light across the desired wavelength range, or at a particular wavelength for a specific section of a system.

In the controllable power and lighting systems herein for domestic and/or commercial systems the LED lights can be spaced according to the preference of the user and the levels of light required in any particular environment.

Any commercially available LED lighting which can be adapted to incorporate a local registration chip as defined herein, may be used in the present controllable power and lighting systems. For the avoidance of doubt, whilst the present controllable power and lighting systems are primarily directed to the provision of white/broad spectrum LED lighting, LED lighting providing bespoke LED coloured light either throughout, or in specific segments or sections of the system can also be delivered via the present systems via use of specific LEDs.

The choice and selection of the particular LEDs for use within the present systems will be dependent upon the commercial and/or domestic applications. As will be appreciated in more complex applications different LED lighting arrangement may be employed in different sections, rooms, floors, or otherwise defined segments of the building or area to be lit in accordance with the particular requirements of said sections, rooms, floors and the like. The number of LEDs which can be incorporated into the LED array(s) of the present power and lighting system is limited only by the relative scale of the particular commercial or domestic application into which the system is to be applied.

Advantageously the present controllable power and lighting system provides LED arrays which can be designed on an area-by-area, room-by-room, section-by-section, or floor-by-floor basis according the needs of the particular environment to be powered and lit.

Use of the present controllable power and lighting system enables for the first time the potential for unprecedented numbers of LEDs within one or more LED arrays to be utilised in large-scale commercial systems comprising millions of LEDs. Advantageously the present system provides means by which LED arrays can be controlled individually, in groups, or all together in a practical manner. As detailed herein the degrees of control provided by use of the present system provides unprecedented levels of flexibility.

For the avoidance of doubt, and according to a particular aspect, each LED light, or strip, or each LED light fitting for use within the present power and lighting systems, contains means for local conversion and final correction of the voltage. Typically this local means for conversion and correction is inverter for the final voltage correction and conversion, for the conversion of the low voltage AC into DC locally to the LED. Each LED strip, or LED light fitting is a complete unit comprising the LED(s), a registration strip, a local rectifier and optionally a power line communications chip.

Typically, the LEDs for use in any particular aspect of the controllable power and lighting system as detailed herein are selected for their ability to provide light across the desired wavelength range throughout the particular commercial and/or domestic application into which they are to be employed, or at a particular wavelength for provision of a specific colour within a section thereof. Exemplary coloured and broad spectrum LEDs for use herein are independently selected from LEDs capable of providing wavelengths in the range of: from about 400 nm to about 700 nm; about 460 nm to about 640 nm; about 460 nm; about 560 nm; about 640 nm, wherein such wavelengths are provided by the individual LEDs, by one or more LEDs arranged in a group or strip, or by all of the LEDs within the array.

In addition the present system may include one or more UV or IR LEDs, as individual lights, or in groups, having wavelengths of less than about 400 nm or greater than about 760 mn respectively to provide bespoke lighting requirements either in specific segments or throughout a power and lighting system for commercial and/or domestic application.

For the avoidance of doubt, the present power and lighting systems may comprise a mixture of different LED light fittings and/or a mixture of coloured, broad spectrum, UV or IR LEDs having different wavelengths.

The term 'about' means that any LED or groups of LEDs which provide wavelengths substantially as defined herein are LEDs suitable for use herein Thus the present invention provides a novel power and lighting system including: LED strip lighting/LED strip lights; strips containing LED lights; LED spot lights, LED floodlights and mixtures thereof.

Lighting System Control

As detailed herein the system includes local means for management of LEDs and/or non-LED devices (where present) within the power and lighting system via use of suitable registration chips and local inverters which may be in the form of a chip. For the avoidance of doubt the automatic correction of voltage drop at an LED or registered group or strip of LEDs within the system is managed by the local inverters on each LED, or group or strip of LEDs, and the registration chip(s) enable identification and individual and/or group control of LED lights or non-LED devices within the system via a suitable control system.

Whilst the selection of any particular LED lighting will depend upon the requirements of the particular commercial and/or domestic application to be lit, the means by which it can be adapted to operate within the present system are as follows:

1. To enable advantageous system control each LED light, or group or LED lights, or strip of LED lights, or strip containing LED lights is fitted with a registration chip which can be identified and controlled separately. The means by which such chips may be fixed to any particular strip are as detailed hereinbefore and can be applied to chip-affixation to individual LED lights, or groups of LED lights;
2. On installation each LED light, or group or strip of LEDs, is calibrated over the range of input currents and 'on-off' pulse widths using a purpose designed spectrometer or spectroradiometer thus enabling the control system to deliver and record the wavelengths, intensities and photoperiods delivered by each LED light, group of LED lights, strip of LED lights, or strip containing LED lights. The means by which such calibration may be carried out are as detailed hereinbefore.

The present control system for the LED array(s) as defined herein uses smart software to manage the data being captured and relayed to the control system from various sources, lighting registration chips, rectifier control means, power line communications chip, wireless technology, local PCs, or other data capture means, in order to provide tailored monitoring and control of the overall growth system in response to such data capture in real-time.

According to one aspect the controllable power and lighting systems as defined herein wherein the LED lighting, including one or more LED strips, or groups of LED strips, or groups of LEDs, or individual LED light fittings/LED(s), are fitted with a registration strip, a local rectifier and optionally a powerline communications chip.

According to an alternative aspect the power and lighting systems as defined herein wherein the LED strips, or groups of LED strips, or groups of LEDs, or individual LED light fittings/LED(s) are fitted with a registration strip, and a local rectifier and wherein the registration chip provides means for communication with local/repeater wireless technology.

Thus the present invention additionally provides a method for adapting commercially available LED lighting for use in the novel power and lighting system and for the management and control thereof as defined herein.

LEDs on T-Shaped Strips and Hosted on Bus Bars

In addition to commercially available LED spot, flood or strip lighting, the present controllable power and lighting systems, and in particular systems for use in commercial growth systems, may include LED-containing T-shaped strips.

According to a further aspect the present invention provides a power and lighting system wherein the lighting may include LEDs hosted on a T-shaped host strip made of conductive material and wherein said strips are hosted upon bus bars and conduct the low voltage AC power from the bus bar to the LEDs, thereby acting as secondary or tertiary bus bars.

The individual LED strips suitable for use with such T-shaped strips comprise an arrangement of one or more LEDs which are connected to one another by suitable AC wiring. In use, the LED strips are co-located with and are adjoined to a suitable substantially T-shaped host strip. Suitable host strips are substantially 'T' shaped for strength, are light weight and typically less than 20 mm wide. The T-shaped host strips may be made of any suitable conductive material which has sufficient strength to support the LEDs during the lifetime of the strip, LED or system. An exemplary T-shaped host strip material for use herein is aluminium.

The number of LEDs on each LED strip can be as little as one, with the maximum number being determined by the DC voltage available from the rectifier divided by the forward voltage required by each LED. For example, at the maximum safe voltage of 50 v AC RMS which would convert to 74 v DC with a typical red LED forward voltage of 2.2 this would be 33 LEDs.

Each LED is surface-mounted on to a suitable PCB which is connected to the aluminium T strip by a thermally efficient adhesive bonding.

These T-shaped LED containing strips are especially suited for use in power and lighting systems for use in proximity to living organisms, such as for example in commercial growth systems as detailed hereinafter. Illustrations of such T-shaped strips having LED containing strips mounted thereon are provided in the Figures herein.

Such T-shaped strips are particularly well-suited for hosting upon bus bars, as illustrated by the linear section of the linear T-shaped strip in the Figures. In addition such T-shaped strips may be bent, twisted or otherwise manipulated to provide bespoke LED strips for use herein, provided that the area of the strip to be located upon the bus bars remains intact and in its original form.

The T-shaped strips should also be capable of acting as a heat sink for the waste heat from the LEDs to be dissipated in order to enable the LEDs to operate at their designed temperature.

Each such T-shaped strip, or group of strips, includes a registration chip and a local invertor which may be in the form of a chip. For the avoidance of doubt the automatic correction of voltage drop at any strip within the system is managed by the local inverters on each strip, and the registration chip(s) enable identification and individual and/or group control of strips within the array(s) via a suitable control system.

Where a series of aluminium T-shaped strips is to be arranged in parallel this means a plurality of individual strips wherein each individual strip is substantially parallel to at least one other individual strip. The number of LEDs which can be incorporated into any strip is limited only by the relative length of the strip and the size of the LED fitting.

Advantageously the present controllable power and lighting system suitable for use in commercial growth systems and/or domestic growth systems as defined in accordance with any of the aspects hereinbefore additionally includes one or more LED arrays hosted on aluminium T-shaped strips which can be designed on an area-by-area, room-by-room, section-by-section, or floor-by-floor basis according the needs of the particular environment to be powered and lit. According to a preferred aspect there is provided a controllable power and lighting system as defined in accordance with any of the aspects hereinbefore suitable for use in growth systems and wherein the one or more LED arrays employed in said system is hosted on aluminium T-shaped strips.

An exemplary arrangement of one or more linear strips of LEDs, for location upon a suitable T-shaped host strip is illustrated in the Figures herein.

The present power and lighting systems as defined hereinbefore may include LED arrays comprising one or more LED strips wherein each LED strip incorporates a local registration chip, and a local inverter wherein said LED strips may be independently selected from: individual T-shaped linear aluminium strips containing LEDs, groups of such T-shaped LED strips arranged in parallel, or alternative LED arrays comprising individual T-shaped bent, twisted or otherwise manipulated aluminium T-shaped strips, or groups of such bent aluminium strips containing LEDs in non-parallel arrangements, or groups of bent strips in non-parallel arrangements.

Use in Proximity to Living Organisms

As indicated hereinbefore, the controllable power and lighting arrangement according to the present invention is suitable for use in a uniform and safe manner in close proximity to living organisms, particularly organisms capable of growth, such as plants.

Historically in commercial greenhouses, plants have been grown under various forms of lighting, typically HID sodium lamps. These are placed high above the plants, typically at from about 2 to 4 meters (m) above the plants, to evenly distribute the light and avoid damage from the large quantities of heat these lamps produce.

These sodium HID lamps are typically powered at 240 v AC and typically produce white light. These lamps take a few minutes to reach full power and the lighting wavelength cannot be adjusted. They are therefore only appropriate for use in systems having long photoperiods and long dark periods. The introduction of light-emitting diode (LED) lighting technology, and in particular the increase in power efficiency and the reduction in cost have led to the interest in replacing HID sodium lamps with LED fixtures.

In addition the ability to control each wavelength independently and to vary the intensities and the photoperiods is very attractive. It is technically possible using LEDs to adjust the photoperiods from milliseconds to hours. LED lighting manufacturers have designed compact LED lighting arrays using conventional printed circuit boards (PCBs) often incorporating 100's of high powered LEDs. These are IP rated and supplied by high voltage, typically 240 v AC.

Commercial growth systems require LED strips to be specifically arranged and the LEDs thereon spaced in a particular manner to effect optimal growth with light efficiency.

Current compact LED lighting arrays are often air cooled with fans because over 50% of the power is typically converted to heat rather than radiant power. In addition to their high heat output such LED arrays are unsuitable for use in close proximity to growth systems due to the manner in which the LED light is spread. In plant growth systems such compact LED arrays are typically placed 2 m to 4 m above the growing crop with associated loss of heat and consequent impact on the plant growth cycle. In an effort to increase efficiency, smaller, strip style LED arrays have been designed which can be placed much closer to the growing crop, but as the LEDs within these strips are arranged uniformly in only one direction these must still be placed at least 50 cm above the growing crop in order to deliver the required uniformity of light distribution.

The Applicant has recognised the need to provide LED strips capable of delivering radiant power distribution in a uniform manner which can be located more closely to growing materials than the presently available conventional compact or strip style LED lighting arrays. In particular, the Applicant has recognised that there is a need to provide strip style LED lighting arrays (LED strips) which deliver uniform power with minimised light paths which are capable of retaining the heat generated close to (<50 cm from) the growing material.

From a commercial perspective it would clearly be of considerable benefit if such modified LED strips could be operated in a cost-efficient manner. For commercial utility across a wide range of growth conditions such LED strips should be capable of providing these power and heat advantages in a manner compliant with the relevant safety standards for use in dry, wet or moist conditions. Given the increased complexity of commercial growth systems where a range of different crops can be produced at one site, the ability for remote control of the wavelength, radiant intensities and photoperiods of such LED strips is a pre-requisite for efficient growth systems.

Many commercial plant growth systems, such as greenhouse and poly-tunnel systems employ both artificial light as well as natural light. For optimal efficiency of the available light, shadow should be minimised, and the amount of natural light passing through to the growing crop should be maximised. This is not possible with either of the presently available systems because as discussed hereinbefore these must be placed at some distance from the growing organisms to protect from overheating, which means that the overall system design is inefficient. Commercially available LED lights are powered with DC current which means that they are typically placed in close proximity to an AC/DC inverter, typically 230 v AC-24 v DC. As discussed previously herein, at low voltage DC there is a significant voltage drop over short distances which mean that for system efficiency in growth systems in particular the AC/DC invertor must be placed at a distance from the strips of less than 5 m, and typically about 2 m from the strips.

When the currently available LED strips are placed in close proximity to growing crops the spacing between each LED light must be increased along the strips in order to deliver the required light uniformity and the adjacent LED strips must be paced closer together to provide the necessary heat. This necessitates use of an increased number of LED strips with associated increases in set-up and on-going operating costs with the associated increased risk of DC voltage drop.

As discussed hereinbefore, to date efforts to resolve this issue have provided modified systems which utilise conventional LED lights in conventional LED strips in association with an increased number of AC/DC inverters which are smaller in size, with increased LED and inverter costs and far higher quantities of high voltage AC wiring. This is especially expensive in commercial growth systems where all wiring and inverters must be IP rated, and also the complexity of such systems means that the measures required for controlling each strip, as well as the wavelength, intensity and photoperiod generated herein becomes impractical as well as potentially hazardous should any fault occur.

Thus, there is a need to provide LED strips capable of delivering radiant power distribution in a uniform manner, which can be located more closely to growing materials, than the presently available conventional compact or strip style LED lighting arrays and which overcome the disadvantages associated with the presently available increased LED light spacing/increased LED strip arrangements. In particular, there is a need to provide strip style LED lighting arrays (LED strips) which deliver uniform power with minimised light paths in a safe and effective manner which are capable of retaining the heat generated close to (<50 cm from) the growing material.

The Applicant has also developed an improved LED array for use with the present controllable power and lighting systems which is suitable for use in close proximity to organisms capable of growth, such as plants. As detailed hereinbefore an LED is a light emitting diode and any LED suitable for use in growth systems may be utilised in the present improved LED arrays. Exemplary LEDs for use in systems suitable for plant growth as defined herein are independently selected from LEDs capable of providing wavelengths in the range of: from about 400 nm to about 700 nm; about 460 nm to about 640 nm; about 460 nm; about 560 nm; about 640 nm, wherein such wavelengths are provided by the individual LEDs, by one or more strips of LEDs arranged in a group, or by all of the strips of LEDs within the array.

The present invention additionally provides a method for the arrangement and control of LED lighting in a uniform and safe manner in close proximity to living organisms and which arrangement is suitable for use in the controllable power and lighting systems as detailed hereinbefore.

Thus according to a further aspect the present invention provides an improved LED array for use with the present controllable power and lighting systems for use in growth systems wherein said LED array comprises a series of individual aluminium strips arranged in parallel wherein one or more individual LED lights can be spaced at any distance along the length of each individual strip, wherein each individual strip is spaced at a similar distance from each individual adjacent strip and wherein the overall LED pattern provided by the LED array approximates to a uniform grid and wherein the LED strips are powered by an AC low voltage power supply.

As detailed hereinbefore use of the controllable power and lighting system of the present invention removes the need to use high voltage AC supplies within a commercial or domestic system, and this is particularly advantageous for controllable power and lighting systems adapted for the promotion of growth of living organisms, this means that there is no longer any need for the high voltage AC supply to be located near the growing environment in a greenhouse or other growing chamber, and ideally enables removal of any high voltage AC to an external location.

This advantageously allows for the improved, controllable LED arrays of the further aspect of the present invention as defined herein to be utilised in close proximity to growing organisms, such as for example plants, greenhouse crops, vegetables, lettuce, fruits, tomatoes, cucumbers, glowers, algae, microorganisms. For the avoidance of doubt the improved, controllable LED arrays herein are also suitable for use in the promotion or management of growth of organisms which are capable of being grown in a growth tower. As detailed hereinafter the improved, controllable LED arrays can be used in close proximity to growing organisms without the heat-related and/or light spread-related risks associated with current systems, whilst overcoming the safety concerns and significant cost issues associated with currently available LED arrays.

For the avoidance of doubt the term LED array(s), or improved LED array(s), or present LED array(s) as defined herein in respect of LED array(s) suitable for use in growth systems means controllable LED array(s) wherein such control is provided via the controllable power and lighting control system comprising low voltage AC power linked to a main transformer wherein low voltage AC power is distribute via bus bars and having means for automatic control of the output of the LED array as detailed hereinbefore.

Proximity and Relative Location of Array to Growth Unit(s)

Close proximity as defined herein means that the present improved, controllable LED arrays can be placed at distances of: less than 50 cm; from about 5 cm to about 25 cm; from about 5 cm to about 20 cm; from about 5 cm to about 15 cm; from about 5 cm to about 10 cm; from growing organisms in a growth system.

Thus the present invention additionally provides a flexible system which allows for LED arrays to be selectively positioned in accordance with the predicted growth heights for the particular organisms within a chosen growth cycle. Advantageously, and as discussed hereinafter the present invention provides a flexible system which allows for different groups of LED strips within an array to be positioned at different heights to one another to accommodate growth of either different organisms/plants, or different stages in the growth cycle of a particular organism/plant. To date, it has not been possible to incorporate such flexibility into LED-based growth systems because of the far-higher minimum distances between the organisms and the arrays.

The relative location of the LED strips within the arrays in relation to the growing organisms can be varied according to the nature of the growth system employed. Exemplary arrangements of the relative location of the LED strips within the arrays in relation to the growing organisms independently include:

growth systems wherein the LED strips of the array are located at a suitable distance above the growing organisms;

growth systems wherein the LED strips of the array are vertically positioned and located at a suitable distance from vertically positioned growing organisms;

growth systems wherein the LED strip arrangement is located at a suitable distance beneath the growing organisms;

and growth systems wherein the LED array is located substantially alongside the growing organisms and positioned at a suitable angle to provide heat and light for growth.

For the avoidance of doubt substantially perpendicular as defined herein includes systems having the array arranged at a 90° angle to the growing organisms as well as systems wherein the array is arranged in a manner so as to substantially provide the equivalent growth parameters, heat and light, associated with a perpendicular arrangement. Such systems may include arrays at 90°+/−5°.

In growth systems wherein the LED strips are vertically positioned, the strips may be positioned along one-side of any single row of supported plants; along both-sides of any single row of supported plants as; or may be positioned to provide strips in-between plants supported in a row in relation to LED strip arrangement.

According to one aspect the present invention provides a controllable power and lighting system for a growth system including one or more LED arrays wherein each LED array comprises a series of aluminium strips arranged in parallel wherein individual LED lights can be spaced at any distance along the length of each individual strip, wherein each individual strip is spaced at a similar distance from each individual adjacent strip, and wherein the overall LED pattern provided by the LED array approximates to a uniform grid, and wherein the LED strips are powered by an AC low voltage power supply and wherein each LED array is associated with one or more growth units.

A growth unit as defined herein includes both vertically arranged stacks of trays or shelves, as well as horizontally arranged rows of trays or shelves in which the organism to be grown is located, wherein said trays or shelves are configured to hold hydroponic, aeroponic, or tray- or pot-based growing systems or soil systems.

The improved LED arrays suitable for use with the controllable power and lighting systems herein can be utilised in a wide variety of growth systems including systems having access to natural light such as for example greenhouses or poly-tunnels, as well as systems without access to natural light such as for example enclosed tower systems.

Advantageously, the present controllable power and lighting system provides for the first time an effective "plug and play" system for complex LED systems for use in systems for the promotion of growth of living organisms, which can be designed and changed by the grower in accordance with the desired growth system to be accommodated and then the individual LEDS, or groups or LEDs can be registered and routinely calibrated as detailed herein.

Exemplary arrangements for use of the present LED arrays in greenhouses and supported growth systems are discussed hereinafter and illustrated in the Figures.

As will be appreciated the advantageous flexibility of design and control afforded by the present controllable power and lighting system in combination with the exceptional efficiencies, desirable grid pattern delivered via the improved LED array as defined hereinbefore and enhanced safety features versus currently-available compact strip-style LEDs also make this an attractive system for use in areas other than growth systems.

Thus according to a further aspect the present invention provides an improved LED array suitable for use in commercial and/or domestic applications wherein said array comprising a series of aluminium strips arranged in parallel wherein individual LED lights can be spaced at any distance along the length of each individual strip, wherein each individual strip is spaced at a similar distance from each individual adjacent strip and wherein the overall LED pattern provided by the LED array approximates to a uniform grid and wherein the LED strips are powered by an AC low voltage power supply. For the avoidance of doubt the control measures for individual LEDs, groups of LEDs within the improved LED array, or the improved array of LEDs in commercial and/or domestic systems as a whole are as defined herein in relation to improved LED arrays for use in growth systems.

According to a yet further aspect the present invention provides a control system for an improved LED array as defined herein wherein the control system includes means for logging of data for measurement of the radiant power of the LED array as a whole, or an individual LED strip, or groups of LED strips within the array without continuous spectroradiometry.

According to an aspect there is provided An LED array for use in growth systems comprising a series of strips arranged in parallel wherein individual LED lights can be spaced at any distance along the length of each individual strip, wherein each individual strip is spaced at a similar distance from each individual adjacent strip and wherein the overall LED pattern provided by the LED array approximates to a uniform grid and wherein the LED strips are powered by an AC low voltage power supply.

Led Arrangement for Use in Improved Arrays in Growth Systems

Use of the present controllable improved LED arrays enables for the first time the potential for unprecedented numbers of LEDs to be utilised in large-scale commercial growth systems comprising millions of LEDs. Advantageously the present improved LED arrays can be controlled individually, in groups, or all together in a practical manner via the controllable power and lighting system as detailed hereinbefore. As detailed herein the degrees of control of the improved LED array provided by use of the present controllable power and lighting system provides unprecedented levels of flexibility to the commercial or domestic grower. The term uniform grid, as defined herein means that the overall pattern provided by the totality of the individual LEDs within any single array has the overall appearance of a grid, or two-dimensional matrix.

As indicated herein, the improved LED array comprises a series of aluminium strips arranged in parallel. A series of aluminium strips arranged in parallel as defined herein means a plurality of individual strips wherein each individual strip is substantially parallel to at least one other individual strip. In contrast to current systems, the number of LEDs which can be incorporated into the present arrays is limited only by the scale of the growth system to which the arrays are to be applied.

Exemplary arrangements of one or more linear strips of LEDs, for location upon a suitable host strip are discussed herein. As detailed herein the flexibility of the present system means that there is a high degree of freedom in relation to the arrangement of the strips of LEDs, and as will be readily appreciated by the skilled person this means that any other desirable configurations, other than those exemplified herein are equally possible.

The improved LED arrays herein can distribute low voltage AC power efficiently over large growing areas from 1 $m^2$ to over 10,000 $m^2$ by use of large high voltage AC to low voltage AC transformers. Exemplary high voltage AC to low voltage AC transformers at or above 150 kilowatts (kw), or 200 kw suitable for use herein can provide efficiencies of around 95 to 99%. Accordingly use of such a transformer in combination with one or more of the improved LED arrays as defined herein could supply a growth system such as a commercial greenhouse with 5000 $m^2$ of growing crop or 7000 $m^2$ total area.

As detailed hereinbefore, transformers for use in the present systems for plant growth are 240 to <50 v AC RMS transformers. As will be appreciated such a transformer can be sized to supply many greenhouses to provide capacity of thousands of meters square. For safety reasons such transformers are located externally. To optimise system efficiency larger transformers are preferred, and as such when a new growth system is being designed the current and future capacities should be considered to ensure that the system is designed to deliver both initial and on-going efficiency. In general, larger transformers provide greater the efficiency, typically in the region of 95% to 99% or more.

As detailed herein, use of the present improved, controlled LED arrays provides efficiency benefits versus current growth systems, for example the present system provides electrical efficiencies in the region of: greater than about 80%; greater than about 85%; about 87% in combination with radiant efficiencies (wall plug efficiencies) in the region of: greater than about 30%; greater than about 35%; greater than about 40%; about 43%, in an example where the LED is 50% radiant efficient. The present systems suitable for plant growth utilise 240 v AC to 24/50 v AC transformers which can be up to 99% efficient at large scale, in combination with local rectifiers/local voltage correction device on each LED strip. Such rectifiers can be selected for optimal efficiency levels, and ideally in the region of about 95% efficient. By use the present control system having 95% efficiency the present system is capable of providing electrical efficiencies in the region of 87% (99%×95%×95%), which corresponds to about 43% wall plug efficiency (50%× 87%), for an LED which is 50% radiant efficient.

Thus a combination of the improved LED array and the controllable power and lighting system using low voltage AC as detailed hereinbefore advantageously overcomes the disadvantages associated with multiple drivers and 240V AC wiring required by currently available systems suitable for use in a growing environment. In particular, currently available compact LED strip style arrays require 240 v AC to 24 v DC drivers to be located very near to the LED strips, typically within 2 m, because of the inherent limitations of 240 c AC to 24 v DC drivers. This means that on a commercial scale, growth systems based on currently available technology require thousands of LED strips, thousands of drivers and thousands of meters of high-cost 240 v AC wiring in order to simply run the system.

Advantageously the present systems which comprise the unique combination of running low voltage AC to the LED strips from a remotely located AC to AC transformer successfully overcomes these issues with the additional advantage that automatic correction of voltage drop at any strip within the system is managed by local inverters on each strip. As also discussed herein the present system is uniquely able to accommodate local controllers for current control and for pulse wave modulation (PWM). In particular the controllers for current and/or PWM control may be located on the strips.

A representation of a growth system utilising this efficient power system is illustrated in the Figures and exemplary greenhouse-based systems are provided in Example 1.

According to a further aspect the present invention provides additional means for protecting the improved LED arrays in the lighting arrangements suitable for use in growth systems from electrical power surges via the use of transformer related surge protection equipment on the high voltage side of the transformer. The means for providing such surge protection is as detailed hereinbefore.

Thus the present invention provides a novel and improved LED lighting system suitable for use in growth systems in accordance with any of the aspects defined herein wherein the system additionally provides means for protecting the lighting arrangements in systems from electrical power surges.

In particular the present invention provides a novel and improved LED lighting system suitable for use in growth systems in accordance with any of the aspects defined herein wherein the system additionally provides means for protecting the lighting arrangements in systems from electrical power surges wherein said means comprises the combined use of surge protection equipment, watchdog timer equipment and optionally one or more fuses. To accommodate greenhouses having very large growing areas of thousands of meters square, the Applicants have designed a modified system wherein the large transformer is installed at a high level inside the greenhouse with only the cabling up to the transformer being IP rated and the remainder of the system being as defined hereinbefore.

Use of Bus Bars in Growth Systems

For greenhouses having very large growing areas, or any other system where the present array and controllable power and lighting system is to employed which has a large footprint, the conductive bus bars not only provide the means for distribution of the low voltage AC power to the rectifier means on the LED strips, but also are advantageously also employed to provide the supporting structure upon which T-shaped strips comprising the LED strips and additional components are placed. As detailed herein before the bus bar systems employ a positive bus bar and a neutral bus bar, and for use in large growing areas/large footprint areas these are typically run in parallel with one another. The +/− electrical connections from the bus bars to the local rectifiers associated with each LED containing T-shaped strip are effected by any suitable means, and in particular by clips from the bar(s) to each strip. A segment of an exemplary parallel positive and neutral bus bar arrangement is detailed and illustrated herein. Advantages of this bus bar arrangement as a host for the T-shaped strips and thereby the LED lighting of the improved arrays herein versus present commercially available systems suitable for use in growth systems are as detailed hereinbefore in relation to the power and lighting system suitable for commercial or domestic use and include: two-step voltage inversion; efficiencies of from 90 to 94%; means for self-regulating system control; provision of automatic voltage correction; ability to control arrays containing more than 100,000 LEDs via use of power line technology; more efficient wiring system with only final wiring being required, and being provided via copper wire; provision of a "plug and play" LED array; use of wireless link(s) to local sensors within the system as part of the management and remote-control of features within the LED array(s), as also the provision of unprecedented efficiencies in running costs and cheaper set-up costs. The present controllable power and lighting system additionally comprising the improved LED array as defined herein provides for the first time a reliable, efficient, controllable and sensitive LED array for use in close proximity to living organisms.

Any suitable bus bars as previously defined herein and in particular metals such as aluminium, copper or brass or mixtures thereof may be used in the present growth systems. The shape, details of commercially available tubular bus bars, and examples of suitable bus bars suitable for use in the present growth systems are as detailed hereinbefore in relation to the power and lighting systems suitable for commercial and/or domestic use. For the avoidance of doubt, the selection of a suitable bus bar, and in particular the wall thickness and/or diameter of the bus bars will be dependent upon the requirements of the particular growth system in which they are to be employed.

As illustrated in the Figures, the improved LED arrays suitable for use in growth systems as defined herein may utilise bus bars within the bus bar assembly which distribute low voltage AC power to the system as supports, these supports may be tubular bus bar supports, and in particular aluminium tubular or substantially tubular bus bar supports.

According to a further aspect the present invention additionally comprises a growth system as defined hereinbefore having conductive bus bars of one or more of Al and Cu or a mixture thereof. Exemplary bus bars for use as the main, or primary, bus bars in the growth systems herein are tubular or substantially tubular aluminium bus bars.

For electrical and heat insulation the bus bars for use in the present growth systems may be protected with any suitable insulating materials, such as for example heat shrink coatings. A section of a coated bus bar is illustrated in the Figures herein. Suitable heat shrink bus bar tubing for use is as detailed hereinbefore and includes BBIT heat-shrinkable bus bar tubing from Raychem.

According to a further aspect the present invention provides additional means for protecting the improved LED arrays in the lighting arrangements suitable for use in growth systems having bus bars from electrical surges, over and above the use of transformer related surge protection equipment on the high voltage side of the transformer. The means for providing such additional surge protection via the use of watchdog-type technology on the low voltage side of the transformer which compares the actual power being used on/distributed by each bus bar to that predicted by the software is as detailed hereinbefore.

As also detailed hereinbefore, as a further feature suitable conventional fuses can also be installed to provide an additional safety measure should the power levels being distributed to any particular bus-bar, or group of bus bars within the growth system exceed a pre-determined level and for the avoidance of doubt such pre-determined level may vary depending upon the nature of the specific growth system, and the relevant breaking capacity/interruption rating of the particular fuse selected for use.

Alternative growth systems having very large growing areas of thousands of meters square such as growth towers or chambers can be powered using the externally located high capacity AC to AC transformer arrangement as illustrated and as discussed herein.

T-Shaped Strips for Use in Growth Systems

The present invention additionally provides an improved, controllable LED array, suitable for use in growth systems, comprising a series of host strips wherein individual LEDs can be spaced at any distance along the length of an individual host strip and where typically each LED containing strip is spaced at a similar distance from the adjacent LED containing strip wherein the overall LED pattern provided by the series of LED containing strips approximates to a uniform grid.

The maximum number of LEDs located on an LED containing strip is determined by the safe, accessible voltage of the LED strip power supply; the minimum number of LEDs on a strip is 1. As detailed herein each LED strip, or group of LED strips, includes a registration chip and a local inverter which may be in the form of a chip. For the avoidance of doubt the automatic correction of voltage drop at any strip within the improved LED array is managed by the local inverters on each LED strip, and the registration chip(s) enable identification and individual and/or group control of LED strips within the array(s) via a control system as provided by the controllable power and lighting system as defined herein.

As indicated hereinbefore, the maximum safe voltage in the UK is <50 v AC RMS or 75 v DC. Use of the present control system and improved LED array removes the need for any expensive IP rated electrical equipment inside the greenhouse or growing chamber. Use of the present improved, controllable LED arrays in growth systems means lower voltages, and typically voltages of less than 30 v DC, or even less than 20 v AC can be used for enhanced safety.

The present improved, controllable LED arrays for use in growth systems are provided via a series of strips, each individually arranged with LEDs spaced at similar distances in two directions. Advantageously this arrangement provides a near perfect grid allowing the LEDs in the strip(s) to be placed very close to the growing crop, such as for example as close as 5 cm from the crop. Each individual LED strip comprises a linear arrangement of one or more LEDs which are connected to one another by suitable AC wiring and wherein the LED strips are co-located with and adjoined to a suitable conductive and substantially T-shaped host strip. Suitable host strips are substantially 'T' shaped for strength, are light weight and typically less than 20 mm wide. This allows natural ambient light to pass through whilst being supported by simple 'wire' style or tubular style support structures in a single layer system or in a multilayer or tiered-support system where additional layers of supported strips are fixed below each.

Figure 11:
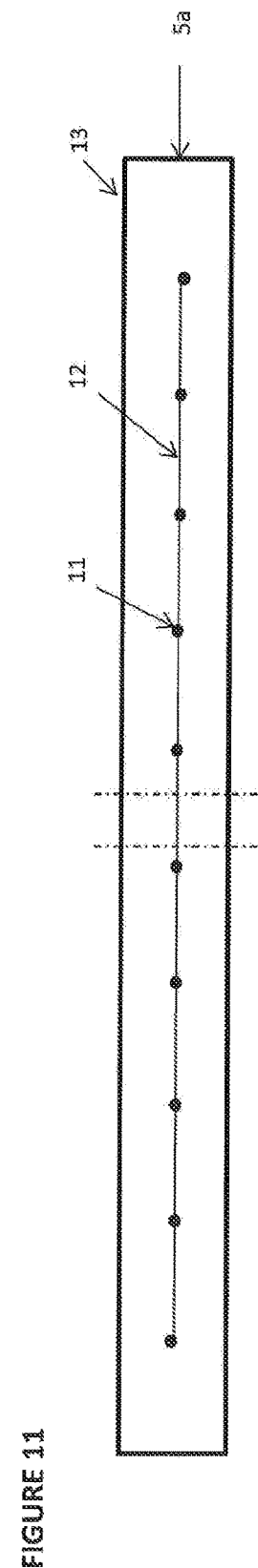
FIG. 11 provides an overhead view illustrating an LED strip suitable for use in the controllable power and lighting systems herein.
Figure 12:
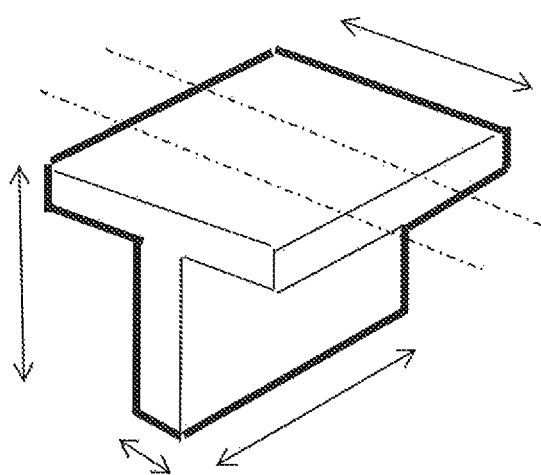
FIG. 12: illustrates a section of an exemplary aluminium T-shaped host strip as indicated by the dotted lines in FIG. 11.

The T-shaped host strips may be made of any suitable conductive material which has sufficient strength to support the LEDs during the lifetime of the system use, and which has the capacity to act as a heat sink. An exemplary T-shaped host strip material herein is aluminium. A section of an exemplary substantially T-shaped aluminium host strip in the directions indicated by dotted lines in FIG. 11 is illustrated in FIG. 12.

For the avoidance of doubt, all references herein to the term strip within an operational LED array, or within an LED exemplary array suitable for use in growth systems means a complete strip comprising a substantially T-shaped host strip with one or more LED strips attached thereto. For the avoidance of doubt, alternative, conductive host strips of different shapes having suitable strength and light-weight properties, or alternative T-shaped host strips comprising mixed materials, whether a mixture of different conductive materials or a mixture of conductive and non-conductive materials can be used.

For plant growth systems which utilise both artificial and natural light this substantially T-shaped design in combination with the lower distances between the growth media and the improved LED lighting array advantageously provides increased levels of natural light. The T-shaped host strips herein should be sufficiently strong and rigid to span between fixing points, which are typically about 2 m to about 4 m apart. These fixing points may be high tensile wires or another appropriate potentially movable fixing means having the potential to be raised or lowered according to crop height. In a preferred embodiment, the tubular or substantially tubular bus bars which provide the low voltage power distribution to the lighting system additionally comprise the fixing means. For example the tubular bus bars as discussed hereinafter can be incorporated into the present systems with suitable means for height adjustment.

As discussed hereinbefore for growth systems having a very large footprint, aluminium tubular bus bars, which may be insulated, are advantageously employed to provide both the required support for the T-shaped LED containing strips, as well as carrying the power source from the transformer to the local rectifiers via suitable connections.

As discussed hereinbefore the T-shaped strips herein should also be capable of acting as a heat sink for the waste heat from the LEDs to be dissipated in order to enable the LEDs in the improved LED arrays for use in growth systems employing the controllable power and lighting system as defined herein to operate at their designed temperature. Advantageously where the system is employed in a plant growth environment the T-shaped strips enable such waste heat to be dissipated back into the growth system as useful heat due to the close proximity of the LED array to the growing crop.

The T-shaped strips are advantageously adapted to provide a sufficient width to allow ambient light to pass through the strips and reach the growing crop.

The number of LEDs on each strip, and the means for mounting LEDs onto T-strips are as detailed hereinbefore.

Thus according to a further aspect the present invention provides an improved, controllable LED array as defined hereinbefore for use in growth systems which does not include a PCB, and which does not require IP rating.

Alternatively micro single component PCBs can be hard-wired in series, or a full length PCB strip can be used in growth systems herein, with associated costs.

Power Supply and Control Functions for Growth Systems

Each LED strip in the improved LED arrays herein, which are suitable for use in growth systems, is in electrical connection with the low voltage AC power supply, as distributed via the progression of power from the bus bar assembly, via main, secondary and tertiary bus bars where present, to the T-shaped conductive strip and thereafter to the LED strip, or to a conductive element or aspect of the T-shaped strip which is in electrical connection with the LED strip, and subsequently to the individual rectifiers for conversion to low voltage DC. This arrangement means there is no need for an IP rating. The low voltage AC is converted to DC at the end of each strip by using an appropriate rectifier. Each LED strip or group of LED strips can be controlled independently.

The means for provision of control of the LED strips is as defined hereinbefore and comprises power line technology, or wireless technology or a combination of both via a wireless link to a local PC and/or via the internet remotely. A representation of a section of an LED array comprising strips incorporating local rectifiers, as well as wireless connectivity to a microcontroller and a PC is illustrated herein.

To enable advantageous system control each strip or group or strips is fitted with a registration chip which can be identified and controlled separately as detailed herein. The method for calibration of each LED strip using a purpose designed spectrometer or spectradiometer is as detailed hereinbefore for the calibration of LEDs, and the purpose of such calibration is to enable the control system to deliver and record the wavelengths, intensities and photoperiods received by the crop from each LED strip. Calibration of LEDs suitable for use in the present improved, controllable LED array(s) for use in growth systems may be carried out on manufacture, on installation into a system, or as required during the life-cycle of an LED, as detailed hereinbefore, such as for example on fixing to a host strip for use herein.

As detailed hereinbefore the LED lights for use in the improved, controllable LED array(s) herein are ideally calibrated and registered prior to the array being operated. To deliver this feature in LED array(s) for use in growth systems a third wire is supplied to the end of each LED strip. Each LED strip has a 'serial identifier chip' to provide serial registration on this low-cost wire network which means that the LED calibration information would be stored against this unique number.

Once the growth system is up and running with the calibrated, registered LEDs then, in the future when any of these combinations are used the data will be known and can be mapped for the growing cycles under each LED strip or group of LED strips.

As detailed hereinbefore the control system for the power and lighting system uses smart software to manage the data being captured and relayed to the control system from various sources, lighting registration chips, inverter monitoring means, power line communications chip, wireless technology, local PCs, or other data capture means, in order to provide tailored monitoring and control of the overall growth system. This smart software is also used in the control system for the improved, controllable LED array(s) as defined herein.

As also detailed hereinbefore in relation to the power and lighting systems, power line technology provides the ability to include communications functionality on top of an existing AC supply waveform. Thus in addition to the advantages and benefits provided via use of the improved, controllable LEDs for use in systems as detailed herein, the invention provides as a further aspect an LED array for use in growth systems as detailed herein having communications functionality.

For the avoidance of doubt, the advantages as previously details as being provided via use of the controllable power and lighting system as detailed hereinbefore equally apply where such systems are utilised in combination with the improved, controllable LED array(s) in growth systems herein.

Thus according to a further aspect the invention provides means for independent control of the wavelength intensity and photoperiod of each LED strip, or groups of LED strips, within the present improved LED arrays for growth systems as defined herein over large areas 1 $m^2$ to 10,000 $m^2$ wherein each strip contains from 1 to 20 LEDs. This process allows for repeatability and data logging of the radiant power delivered over the growing cycle to be measured, and for the first time provides information in real-time as to the power being delivered to the growing organisms or plants, either across the system, or within individual sections, segments, sectors or growth-lines of the system wherein these individual areas within the system are aligned to corresponding LED strips or groups of LED strips within the present array.

According to a yet further aspect the present invention provides a control system for use in a growth system comprising an improved LED array as defined herein wherein the control system includes means for logging of data for measurement of the radiant power of the LED array as a whole, or individual strip, or groups of strips within the array without continuous spectroradiometry.

Thus by linking the control system for the improved LED array to plant sensors and light sensors an overall control system providing real-time or periodic data-sets which enable progressive/on-going of optimisation and/or maintenance of pre-defined output levels within the system can be achieved.

Typically the wavelengths provided by the LED strips within the improved LED arrays for use in growth systems as defined herein are red 640 nm, blue 460 nm and green 560 nm, although many more wavelengths are possible depending upon the particular arrangement selected.

Thus according to a further aspect the present invention provides a controllable system for providing effective light levels to a plant growth system via an improved LED array as defined hereinbefore and wherein it is a feature of said control system that there is no need for on-going measurements of the LED wavelengths, intensities or photo periods.

According to a yet further aspect said control system can be linked to a natural light meter to enable the controls to adjust the individual LEDs within the improved LED arrays as light levels change in the growth environment, such as for example a greenhouse.

Since LED lights are between 30-60% efficient (radiant power to electrical input power) large amounts of heat are produced. By placing an optically efficient thermal screen immediately above the strips in the array it is possible to retain more of this heat in the growing environment and less is wasted in to the head space of the greenhouse. If the height of the thermal screen can be adjusted or partially opened the temperature at the plant level can be controlled and where the temperature is too high standard greenhouse ventilation equipment will reduce it in the normal way. For systems having a very large footprint wherein the T-shaped LED containing strips are supported by one or more aluminium bus bars, which may be insulated, the thermal screen can be located on top of the bus bar(s).

Materials suitable for use in current commercially available thermal screens, such as clear plastics which allow natural light to pass when it is cold but sunny, are suitable for use in modified/adjustable thermal screens herein, as are modified marketplace thermal screens which subsequently modified for height adjustability can be used to provide thermal screening herein. In practice the thermal screen could be in sections to allow some sections to be opened for extra cooling/ventilation. Alternatively there could be two screens on top of each other, one with holes and one without holes.

Similarly, humidity and $CO_2$ levels can be controlled around the plants by the incorporation of automated fans linked to the humidity and $CO_2$ levels in the 'head space' of the greenhouse.

Thus according to a further aspect the invention provides a controllable power and lighting system as defined hereinbefore for use in growth systems as previously defined wherein the lighting is provided by an improved LED array as defined herein and wherein the system additionally includes means for automated control of one or more of: relative height of one or more thermal screens within the growth system; one or more fans linked to the humidity and $CO_2$ levels within the growth system.

A particular feature of the present systems for the provision of improved, controllable and uniform LED lighting in growth systems is the ability to power the LEDs at a voltage that is safe for operatives especially where moisture and water may be present. In plant growth systems this is achieved by connecting the LED strips to an AC low voltage power supply, between 12-50 v AC, typically 24-36 v AC.

This allows the high voltage supply to be either external to the entire greenhouse or placed at high level inside the greenhouse or externally in a closed system with no natural light. This low voltage AC supply is provided by a simple AC transformer from high voltage to low voltage AC which typically can be placed either at high level in the greenhouse or externally. The conversion from low voltage AC to low voltage DC which is necessary to power each strip is facilitated by an AC/DC rectifier at the end of each strip. A further safety advantage provided by use of the present system for the provision of improved, controllable and uniform LED lighting for growth systems versus those currently available is that once the system has been installed the operatives managing the growth of the plants, or responsible for day-to-day maintenance of the plant growth environment can safely install and maintain all the LEDs, because they are operating at only low voltage AC. This leads to additional commercial operating cost reductions.

The overall efficiency of the LED array(s) within the present systems for the provision of improved, controllable and uniform LED lighting in growth systems can be controlled to maintain operational voltages which optimise the rectification.

Thus according to a further aspect there is provided herein a control system for use in a growth system comprising an LED array as defined herein wherein the control system includes means for logging of data for: measurement of: the radiant power of the LED array as a whole, or individual strip, or groups of strips within the array; measurement of growth of the organisms within the system via plant sensors; and/or measurement of light levels within the growth system via light sensors, and wherein the system includes means for automated control of one or more of: relative height of one or more thermal screens within the plant growth system; one or more fans linked to the humidity and $CO_2$ levels within the plant growth system and wherein said control system provides means for control of the operational voltages to maintain efficiency of 90% or above.

As discussed hereinbefore the present invention additionally provides means for independent control of each individual strip or group of strips containing either one or more strings of LEDs of different wavelengths uniformly.

The Applicant has also found that the present power and lighting system comprising low voltage AC distributed via bus bars to one or more LED arrays wherein the array(s) have local registration chips and means for local rectification is highly compatible with both power line technology and local/repeater wireless technology. For power and lighting systems herein which require the capacity to deliver significant/strong wireless signal strength, such as for example in applications where internet access is required, local/repeater wireless technology can be advantageously employed.

Control of such systems is achieved with low voltage control lines, power line technology or wireless technology, commanded by a central microcontroller. This microcontroller also acts as the gateway for traditional Personal Computer (PC) communications. This data can be arranged to vary the intensity or radiant power at each wavelength and photoperiod either by varying the current or by incorporating PWM. The method of communications between the gateway (microcontroller) and PC can be through hard wired means serial or Ethernet etc., or using wireless technology, via Wi-Fi, snap, Zigbee, Xbee and other wireless protocols.

Thus according to a further aspect each individual LED strip or group of LED strips within the present array can be individually registered for control ultimately via technology the internet with all data collected, controlled and/or managed via a power line communications chip, or wireless technology.

Such control is provided by a local PC linked to a central microcontroller which is wireless enabled. Each LED strip or more typically each group of strips, receives the wireless signal and distributes the command to each individual strip/group via a series of low voltage control wires which link the strips together. Alternatively power line technology via the low voltage AC supply can be used. These same control wires and wireless signals are two-directional and able to send commands and collect data from local sensors and other monitoring equipment.

The ability to control the intensity and the photoperiod of each wavelength on each strip allows for feedback loops to vary the LEDs according to the ambient light conditions in a greenhouse or the crop conditions in a closed growing environment. This allows for the optimum use of power by optimising the LED photon production with optimal photosynthesis.

This process of optimisation can be evolutionary either by experimentation or by the introduction of hyper spectral imaging to measure all aspects of plant stress. This data can be collected via the control system linked to imaging and light sensing equipment allowing feed-back loops to control the light in real time.

As evolutionary algorithms are introduced and the financial input costs and crop outputs are measured the overall costs of production can be minimised. Further, the varying costs of power throughout can be factored in to minimise the costs of power.

This approach, when compared to HID sodium lamps or fixed output LED arrays will reduce the requirement for heating in greenhouses or in closed growing environments. In closed systems, the increased system efficiency reduces the need for cooling.

The Applicant has found that the unprecedented efficiencies in terms of lighting and/or heating/power costs from the use of aluminium bus bars and low voltage (<50 v AC) for power distribution to the present LED arrays, has manifold applications in both commercial and non-commercial/domestic applications.

In particular, the Applicant has found that bus bars at low voltage AC can be advantageously used to power LED lights, individually or in groups, within one or more LED arrays within commercial and/or domestic applications buildings, and where 'power line' technology, provided via the bus bars provides a desirable control system for the lighting system, wherein the control system communicates with each individual LED light/groups of one or more LED lights or one or more arrays of LED lights via use of one or more LED-specific registration chips for identification and control of individual lights or groups of lights to provide a remote controlled and monitored system, and wherein automatic correction of voltage drop within the system is managed by local inverters associated with each array.

As also discussed herein the present system is uniquely able to accommodate local controllers for current control and for pulse wave modulation (PWM). The controllers for current and/or PWM control may be located on the bus bars.

Figures

Representative examples of bus bars and controllable power and lighting systems utilising low voltage AC power distributed via bus bars suitable for use in commercial and/or domestic applications are illustrated hereinafter. In particular examples of such systems having aluminium bus bars, at low voltage AC, used to power LED lights, individually or in groups, within one or more LED array and the capacity to power non-LED devices where 'power line' technology, provided via the bus bars, provides a control system for the lighting system, and wherein the control system communicates with each individual LED light/group or array, or non-LED devices via use of one or more registration chips for identification, as well as particular aspects of features of such systems are illustrated in and are discussed in relation to FIGS. 5 to 8 presented hereinafter.

For the avoidance of doubt, whilst FIGS. 5 to 8 illustrate the utility of a power and lighting system in accordance with an aspect of the invention within specific environments, the particular features of the power distribution system and LED arrays illustrated therein and as discussed herein after are equally applicable for use in alternative commercial and/or domestic arrangements. As such the following FIGS. 5 to 8 provide representative examples of particular embodiments of an aspect of the present invention and are not intended to be limiting thereon.

Representative examples of growth systems incorporating a novel and inventive LED array, as also detailed herein as well as particular aspects of features of said array are illustrated in and are discussed in relation to FIGS. 14 to 18 presented hereinafter.

For the avoidance of doubt, whilst FIGS. 14 to 18 illustrate the utility of an LED array and control system therefore for use in a growth system in accordance with the invention within a specific environment, a greenhouse of capacity up to 10,000 m² or greater where the LED array is used to supplement natural lighting at different times of the day, the particular features of the LED arrays illustrated therein and as discussed herein after are equally applicable for use in smaller greenhouses having growth areas of from 1 m² up to 10,000 m², as a supplementary light source, for use in the dark growth systems from 1 m² to 10,000 m² and beyond and in particular for use in growth chambers, multi-layer growing systems or integrated growth system (IGS) towers which do not utilise natural light in the growing process.

As such the following Figures provide representative examples of particular embodiments of the present invention and are not intended to be limiting thereon.

Figure 1C:
Figure 1A:
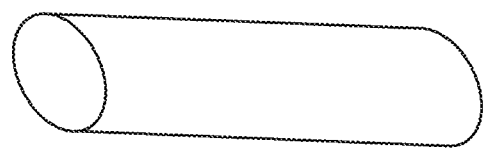

FIG. 1: illustrates a side-angled view of a section of three exemplary bus bars suitable for use in the controllable power and lighting systems of the present invention. In particular FIG. 1 illustrates a primary, or main bus bar FIG. 1(*a*), a secondary bus bar FIG. 1(*b*) and a tertiary bus bar FIG. 1(*c*), as is shown in the Figure, all three bus bars are tubular with a hollow interior. The diameter of the primary bus bar is greater than that of the secondary bus bar, which in turn has a greater diameter than that of the tertiary bus bar.

FIG. 2: illustrates two views of a concentric bus bar arrangement. FIG. 2(*a*) provides a partially exploded illustration of a tubular bus bar arrangement having an internal bus bar, surrounded by an external bus bar, also illustrated in the Figure, as a separate feature is a tubular insulating section for slotting between the internal and external bus bars of the tubular bus bar arrangement to provide an internally insulated concentric bus bar arrangement. FIG. 2(*b*) is a side-view of a segment of an exemplary concentric tubular bus bar arrangement with internal insulation having an internal bus bar (A) and an external bus bar (B) which surrounds, but does not come into electrical contact with the internal bus bar. For the avoidance of doubt, for illustrative purposes FIG. 2(*b*) indicates protuberance of the internal bus bar from the external bus bar sleeve at either end. In practical applications during use it is envisaged that the internal bus bar, particularly where the internal bus bar is a line bus bar will be encased within the external bus bar during use in order to provide electrical safety. In the segment of an exemplary bus bar arrangement of FIG. 2(*b*), both the internal bus bar and external bus bars are hollow tubes, and there is a tubular insulating section (C) which surrounds the internal bus bars and is located in between the bus bars.

FIG. 3: illustrates how the power for the controllable power and lighting system in accordance with the present invention could be distributed in practise from a main power source, and in this example from the grid, via one or more transformers to a bus bar assembly within a building to provide power and lighting to LED lighting. As illustrated, the mains power, at mains supply level i.e. 240 v AC, is provided by the grid (D) to a transformer (which may be located externally or internally according to the requirements of the power and lighting system), the transformer (E) provides a first step-down in AC voltage to less than 50 v AC RMS and this low voltage AC power is then distributed via a bus bar assembly, comprising a series of primary (F), secondary (G) and tertiary (H) hollow tubular positive and neutral bus bars wherein each pair of positive and neutral bus bars are arranged in parallel to one another. A pair of parallel positive and neutral bus bars is illustrated for the primary bus bars (F1, F2) whilst for the secondary and tertiary bus bars only the positive bus bars of the corresponding pairs are shown for the purposes of figurative clarity. For the avoidance of doubt in the bus bar assembly illustrated in FIG. 3 the primary bus bars have the greatest diameter and the tertiary bus bars have the smallest diameter. The connection means between the primary and secondary bus bars and or between the secondary and tertiary bus bars are not shown. Such connections can be effected by any of the means detailed in the present description. The low voltage AC power is distributed from the primary bus bars to the secondary bus bars and thereafter to the tertiary bus bars. Three pendant LED lighting devices are shown, one of these is labelled (I), which are in electrical connection with the tertiary bus bar systems via copper wiring (J). Each LED lighting device is in connection with local voltage control means (K) for the provision of second step down voltage control. For the avoidance of doubt such local voltage control means is as detailed in the present description.

Figure 4:
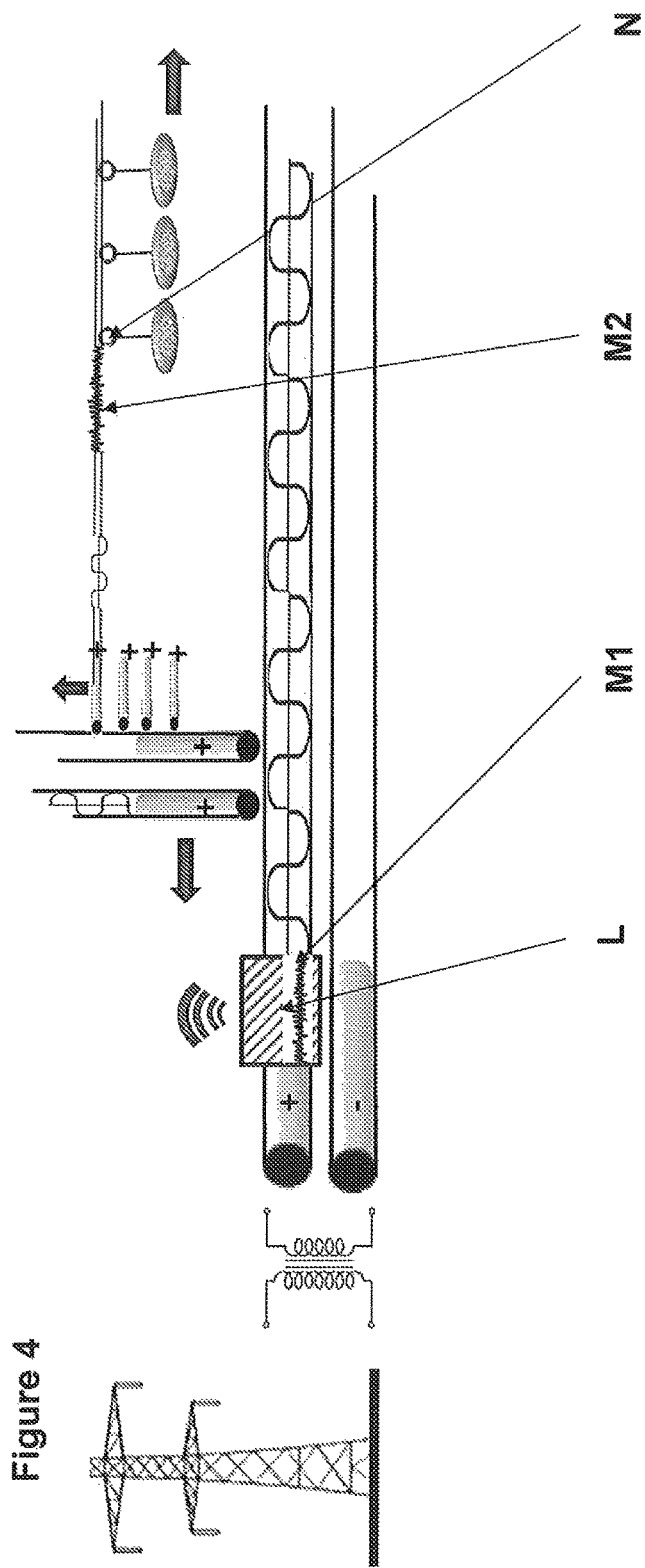
FIG. 4 illustrates how a powerline gateway and PC linked to the internet are utilised in an exemplary controllable power and lighting system in accordance with the present invention for the control of data to and from one or more devices within the system.

FIG. 4: illustrates how a powerline gateway and PC linked to the internet are utilised in an exemplary controllable power and lighting system in accordance with the present invention for the control of data to and from one or more devices within the system. For the avoidance of doubt, whilst FIG. 4 illustrates a system having LED lighting, this exemplary set-up can also be used for the provision of controllable power to one or more non-LED based devices. As detailed hereinbefore in relation to FIG. 3, in the system illustrated in FIG. 4 the high voltage mains power is reduced to less than 50 v AC RMS via use of a suitable transformer with the resultant low voltage AC power being distributed via a bus bar assembly, comprising a series of primary, secondary and tertiary hollow tubular positive and neutral bus bars wherein each pair of positive and neutral bus bars are arranged in parallel to one another.

Figure 5A:
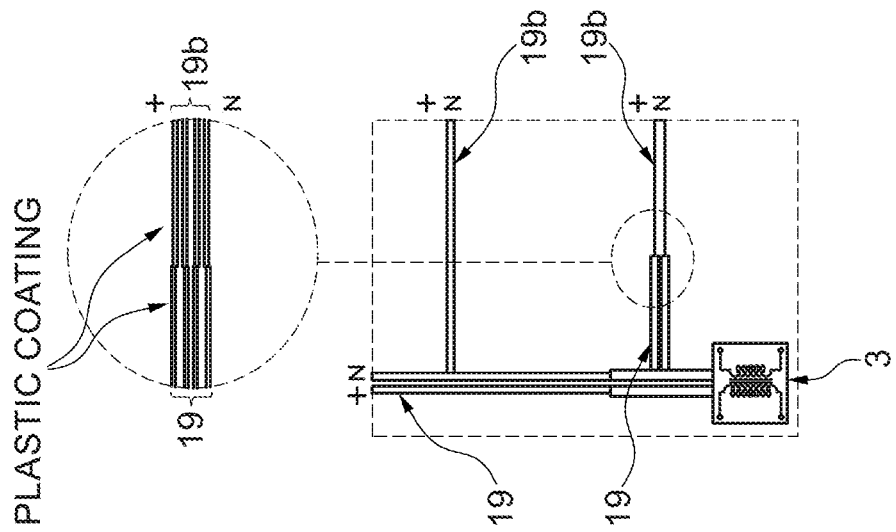
FIG. 5a illustrates a detailed view of the coated positive and coated neutral bus bar component running in parallel to one another in a section of the secondary tubular coated bus bar (19b) as illustrated in relation to small office block (18) in FIG. 5.
Figure 5:
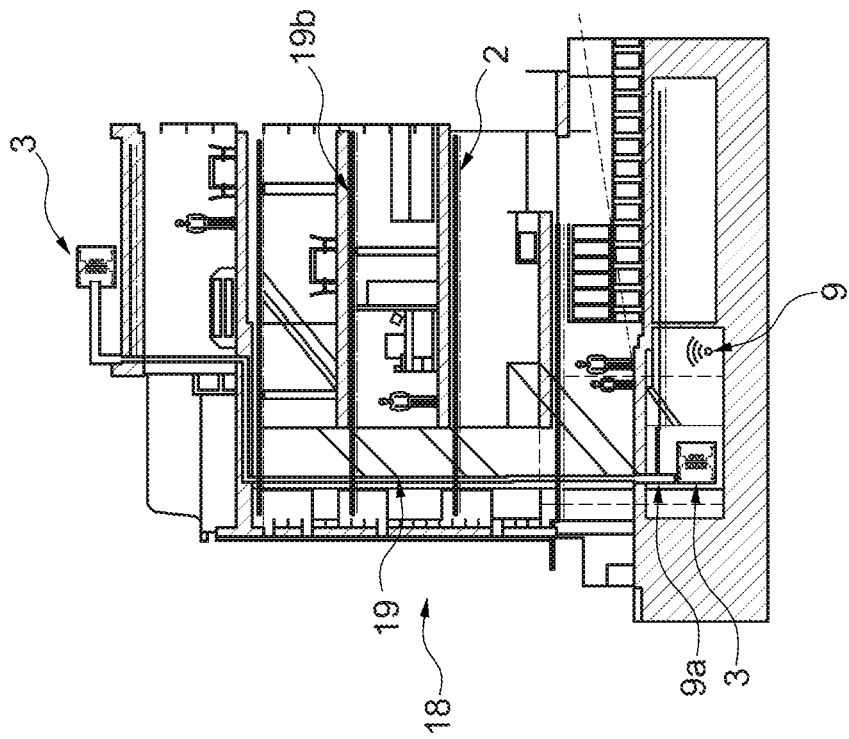
FIG. 5 illustrates a small office block (18) having multiple floors wherein the main AC transformer (3) is located externally and on the top of the building, this large AC to AC transformer (3) receives power from any suitable source of 240 v AC such as a power line, a source of solar power, renewable power sources such as wind power.

FIG. 5: illustrates a small office block (18) having multiple floors wherein the main AC transformer (3) is located externally and on the top of the building, this large AC to AC transformer (3) receives power from any suitable source of 240 v AC such as a power line, a source of solar power, renewable power sources such as wind power. The main bus bar (19) is plastic-coated (as illustrated in FIG. 5*a*, and as indicated by the thicker line, is provided with a further insulating/protective coating from the connection to the main AC transformer at the top of the building to the point of entry into the building (18). The transformer converts this 240 v AC input power to less than 50 v AC RMS prior to entry into the building (18) wherein the so-converted power is distributed throughout each level of the building, i.e. to each office floor within the building (not labelled) as well as the basement, via a system of bus bars (19). At each level power is provided to the LED arrays (2) at each level via secondary bus bars (19*b*) which link the LED strips within the array(s) together.

Figure 10:
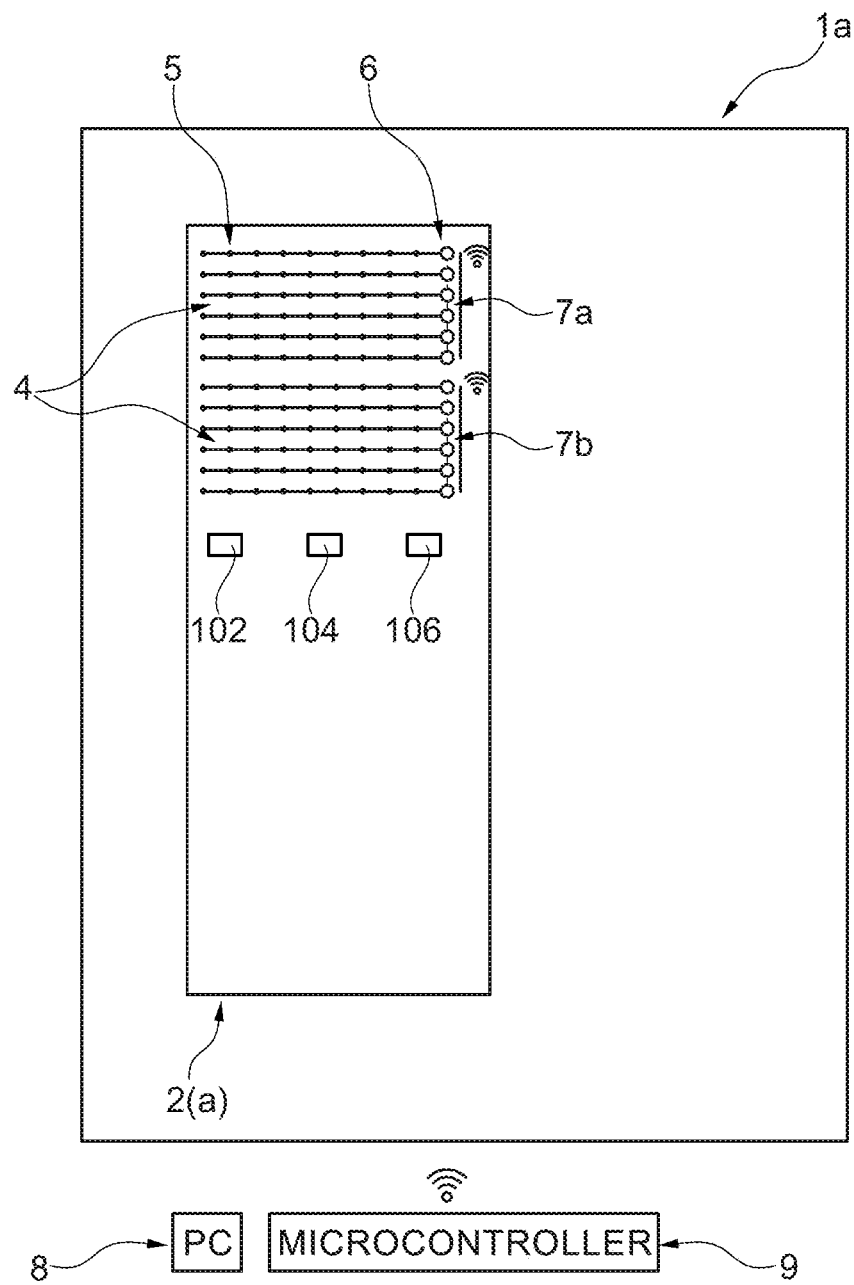
FIG. 10 illustrates how each individual LED strip (5) or group of LED strips (4) can be individually controlled ultimately via the internet with all data collected via the cloud.

As illustrated in FIG. 10 via each individual LED strip (5) or group of LED strips (4) within the LED array(s) of the office block (18) in this FIG. 5 can also be individually controlled ultimately via the internet with all data collected via the cloud.

FIG. 5 also illustrates a the use of powerline technology (9*a*) and a central microcontroller (9) which is wireless enabled is linked to a local PC (not illustrated) and each LED strip or more typically each group of strips within the array(s) receives the wireless signal and distributes the command to each individual strip via the series of secondary bus bars (19*b*) which link the strips together. The wireless signals are two-directional and able to send commands and collect data from local sensors such as movement sensors (102), light sensors (104) or light meters (106) and other monitoring equipment.

FIG. 5*a*: illustrates a detailed view of the coated positive and coated neutral bus bar component running in parallel to one another in a section of the secondary tubular coated bus bar (19*b*) as illustrated in relation to small office block (18) in FIG. 5. FIG. 5*a* also illustrates an expanded view of a section of the primary (19) and secondary (19*b*) components of the bus bar assembly in the lower levels of the building and shows the coated positive and coated neutral bus bar components of each of the main and secondary bus bars which running in parallel to one another, and illustrates the substantially vertical arrangement of the pair of main bus bars, and the substantially horizontal arrangement of the two-pairs of secondary bus bars in each of the two building levels. A further transformer (3) and powerline technology (9*a*) are also illustrated.

Figure 6:
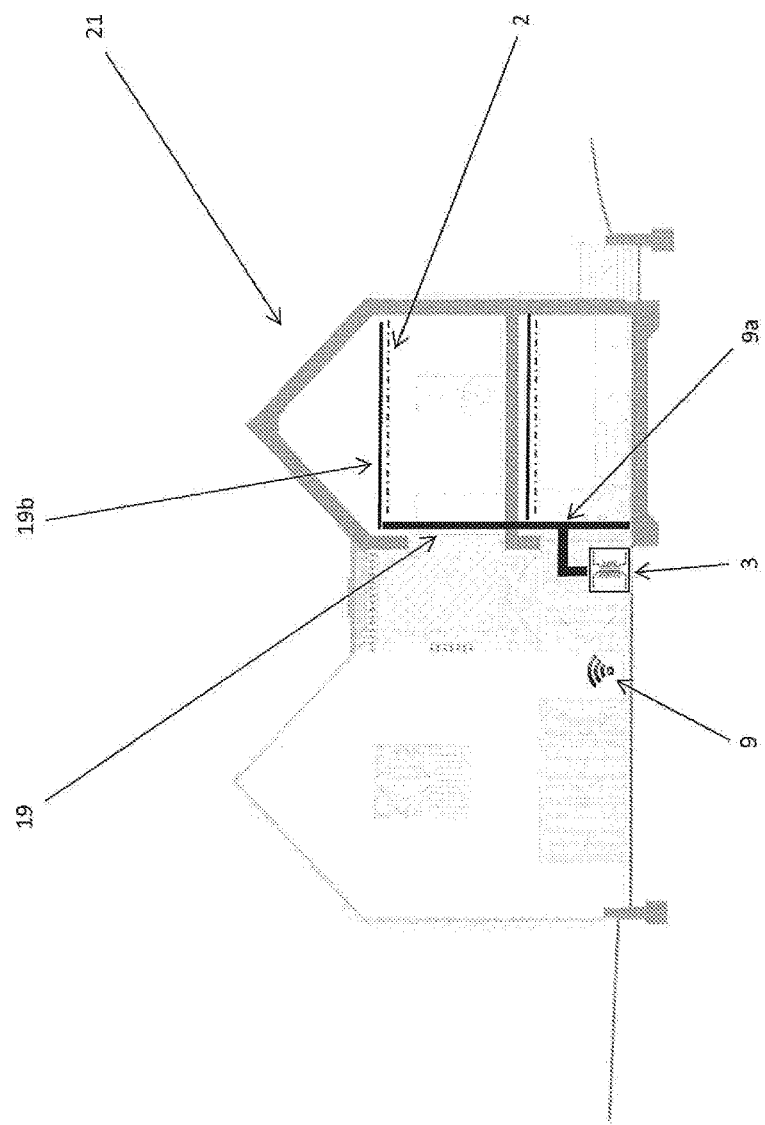
FIG. 6 illustrates a domestic building (21) having two floors wherein the main AC transformer (3) is located externally and at the side of the building.

FIG. 6: illustrates a domestic building (21) having two floors wherein the main AC transformer (3) is located externally and at the side of the building, this large AC to AC transformer (3) receives power from any suitable source of 240 v AC in the same manner as previously illustrated and described for the small office block (18) and converts the 240 v AC input power to less than 50 v AC RMS prior to entry into the building (21) wherein the so-converted power is distributed throughout each floor of the house, via a system of main bus bars (19) with power being provided to the LED arrays (2) at each level via secondary bus bars (19*b*) which link the LED strips within the array(s) together. For the avoidance of doubt the LEDs within this system are controllable in accordance with the arrangement as illustrated in FIG. 10, and as detailed in relation to the small office block (18).

A central microcontroller (9) which is wireless enabled is linked to a local PC (8) (not illustrated) and each LED strip or more typically each group of strips within the array(s) receives the wireless signal and distributes the command to each individual strip via the series of secondary bus bars (19*b*). These wireless signals are two-directional and able to send commands and collect data from local sensors and other monitoring equipment. Powerline technology (9*a*) is also illustrated in the Figure.

Figure 7:
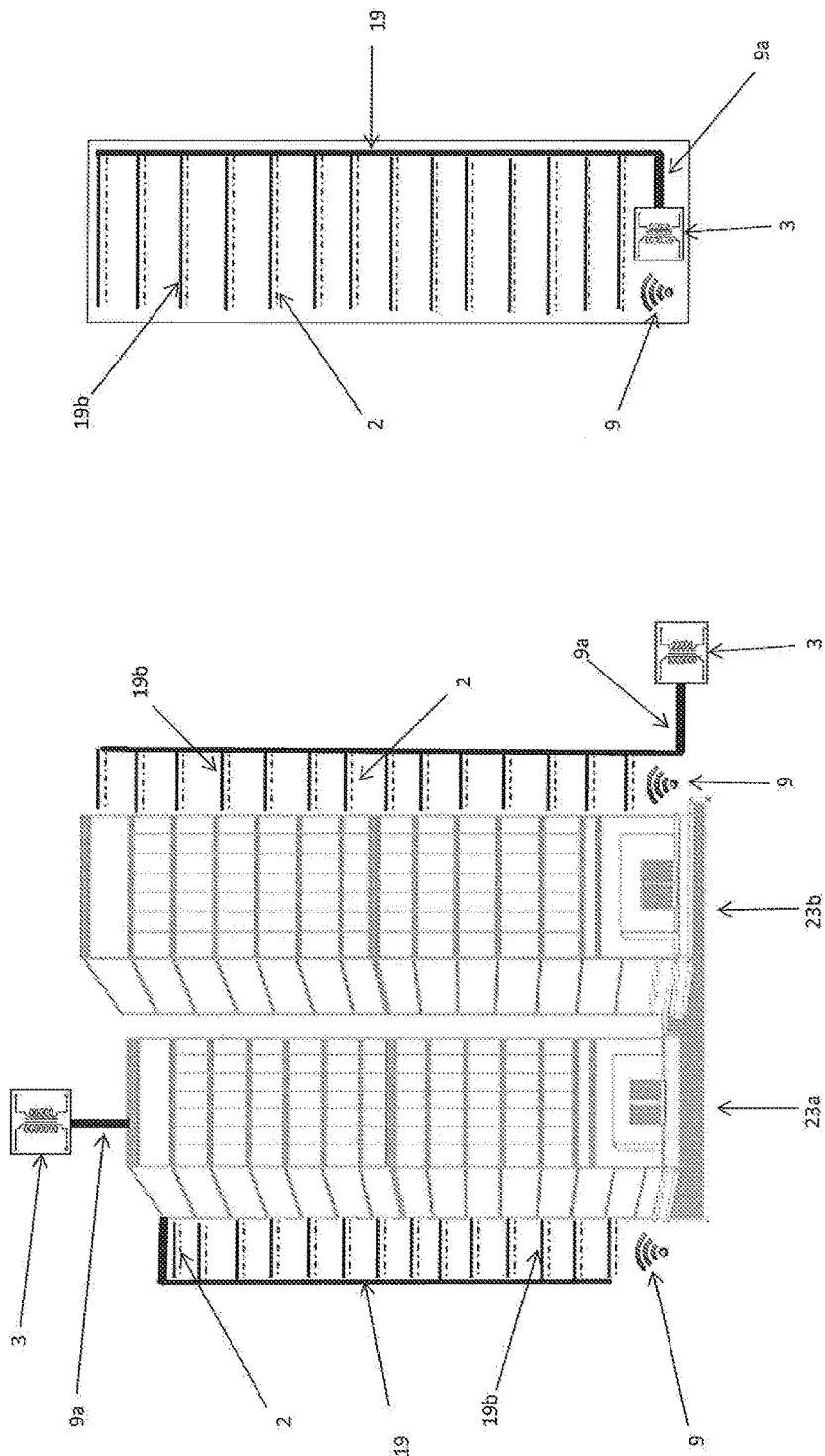
FIG. 7 illustrates two of commercial office blocks (23a) and (23b) having a combined power and lighting system.

Whilst the internal LED and power arrangement in building (21) is illustrated for the right hand side of the building only, it will be appreciated that the system is fully operable throughout the entire building via appropriate bus bar, LED array(s) and low voltage wiring linked to the wireless enabled microcontroller (9). FIG. 7: illustrates two of commercial office blocks (23*a*) and (23*b*) having a combined power and lighting system wherein the main AC transformer (3) is located externally and on top of block (23*a*), this large AC to AC transformer (3) receives power from any suitable source of 240 v AC in the same manner as indicated for the small office block (18) and domestic building (21) as also discussed and illustrated to convert the 240 v AC input power to less than 50 v AC RMS prior to entry into block (23*a*) wherein the so-converted power is distributed throughout each floor of the block, via a main bus bar arrangement (19) with power being provided to LED arrays (2) at each level via secondary bus bars (19*b*) which link the LED strips within the LED array(s) together. For the avoidance of doubt the LEDs within this system can also be individually controlled ultimately via the internet with all data collected via the cloud in accordance with the arrangement as discussed and illustrated hereinafter in relation to the small office block (18).

Local microcontrollers (9) which are wireless enabled are located within each building and are linked to a local PC (8) (not illustrated) and each LED strip or more typically each group of strips within the LED array(s) (2) receives the wireless signal and distributes the command to each individual strip via the series of secondary bus bars (19*b*) which link the strips together. These wireless signals are two-directional and able to send commands and collect data from local sensors and other monitoring equipment.

Whilst the internal local microcontrollers in blocks (23*a*) and (23*b*) are shown at ground level, it should be appreciated that this can be located at any suitable position within the blocks which are convenient.

For the purposes of illustration only, the internal power distribution and lighting arrangement in block (23*a*) comprising a main bus bar (19) which distributes power to the LED arrays (2) from a main transformer (3) at the top of block (23*a*) via a series of main bus bars (19) and secondary bus bars (19*a*), with control of the block being provided by powerline technology (9*a*) and local wireless enabled microcontrollers (9) is shown in an exploded view at the left hand side of the building. Similarly the internal power distribution and lighting arrangement provided from a further transformer (3) to main bus bar assembly (19) and thereby to, a series of secondary bus bars (19*a*), and LED arrays (2), with control of block (23*b*) being provided by powerline technology (9*a*) and a local wireless enabled microcontroller (9) is also shown in exploded view on the left hand side of the building.

For the avoidance of doubt, the remote-control of either of blocks (23*a*) or (23*b*) may be managed separately or individually using the control system herein.

FIG. 7*a*: provides an expanded view of the internal system within block (23*a*).

Figure 8:
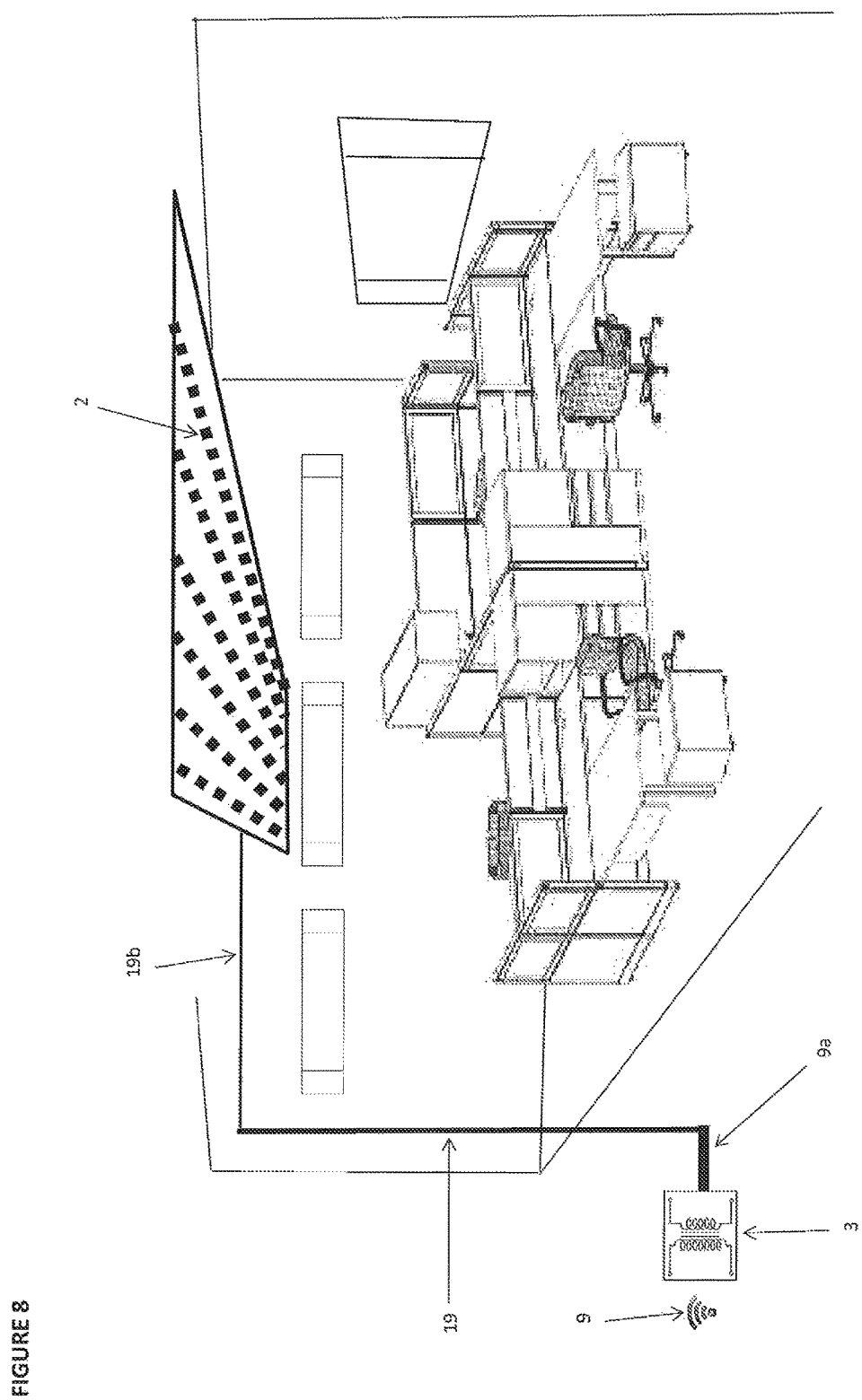
FIG. 8 illustrates a single office within block (23a), and in particular a suspended LED array (2) with power distributed from a transformer (3) via a main bus bar arrangement (19) and secondary bus bar arrangement (19b) with wireless system control and management being provided by wireless enabled microcontroller (9) and power line technology (9a).

FIG. 8: illustrates a single office within block (23*a*), and in particular a suspended LED array (2) with power distributed from a transformer (3) via a main bus bar arrangement (19) and secondary bus bar arrangement (19*b*) with wireless system control and management being provided by wireless enabled microcontroller (9) and power line technology (9*a*).

Figure 9:
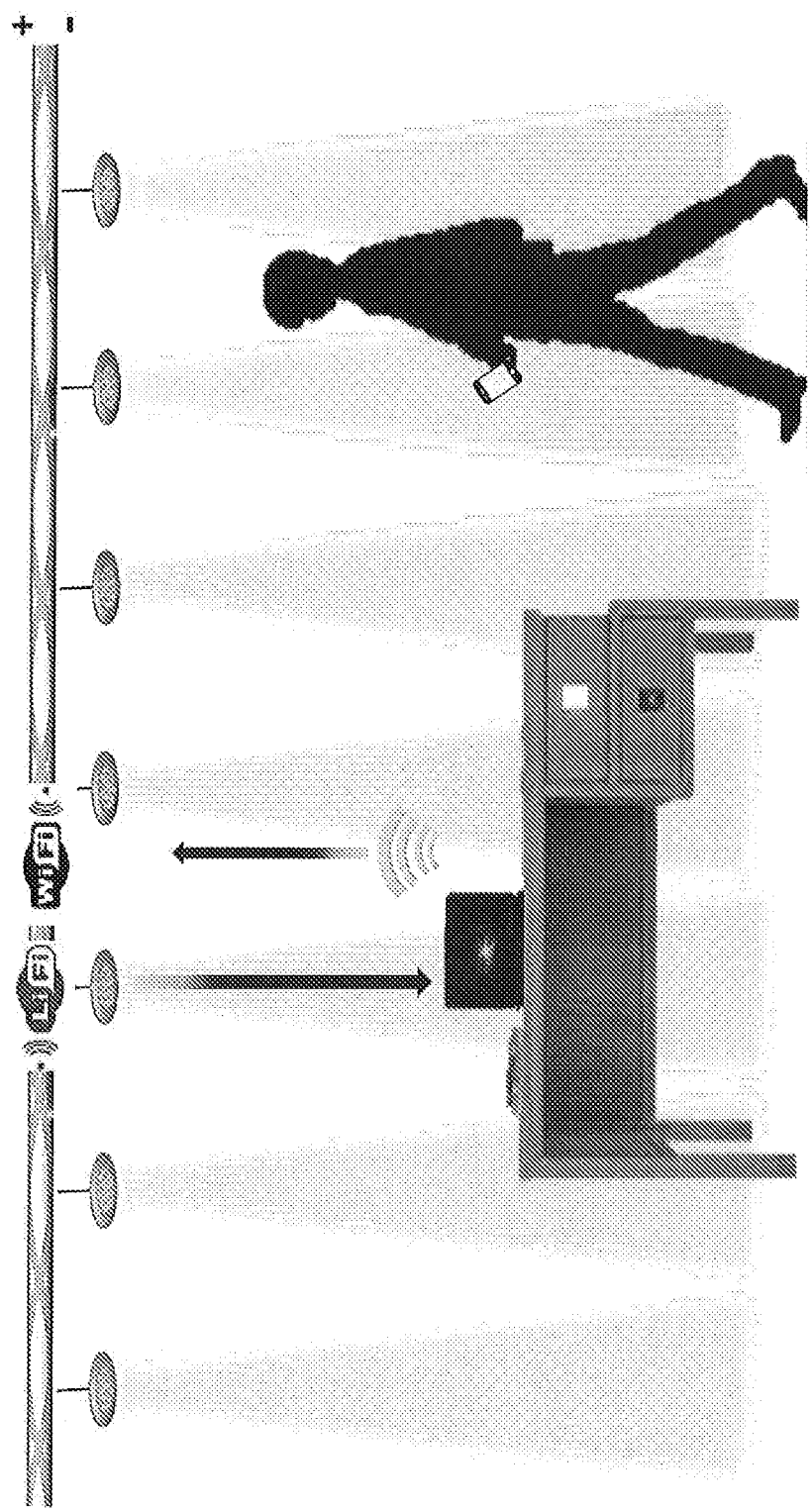
FIG. 9 illustrates a portion of a controllable power and lighting system in accordance with the present invention.

FIG. 9: illustrates a portion of a controllable power and lighting system in accordance with the present invention, and in particular an area of a room, or office space wherein a combination of Li-Fi and Wi-Fi wireless technologies are used to connect to and transmit data-back to the control system from mobile non-LED devices having smart technology, a smart phone and a laptop computer. FIG. 9 additionally illustrates a portion of an LED lighting array as defined hereinbefore wherein the LED lighting is provided via a number of pendant lighting units.

FIG. 10: shows how each individual LED strip (5) or group of LED strips (4) can be individually controlled ultimately via the internet with all data collected via the cloud. FIG. 10 illustrates an arrangement of six strips (5) of LEDs, arranged in a group (4) with control wires (7a) and (7b), having a local microcontroller (not illustrated) which is co-located within PC (8), having wireless functionality (10) and AC/DC rectifiers (6). FIG. 10 also illustrates the connectivity and flow of current through the illustrated section from and back to the transformer (3). Local PC (8) is linked to a central microcontroller (9) which is wireless enabled. Each LED strip (5) or more typically each group of six strips (4), receives the wireless signal and distributes the command to each individual strip (5) via a series of low voltage control wires (7a), (7b) which link the strips together. These same control wires (7a), (7b) and wireless signals are two-directional and able to send commands and collect data from local sensors such as movement sensors 102, light sensors 104 or light meters 106 and other monitoring equipment.

FIG. 11 provides an overhead view illustrating an LED strip suitable for use in the controllable power and lighting systems herein. FIG. 11 shows a string of equally spaced LEDs (11) connected together by suitable wire (12) are assembled on the same aluminium T-section host strip (13) for the provision of an LED strip (5a) providing controllable LED lighting at a specified wavelength. Controllable LED lighting of differing wavelengths are possible by either using different LEDs on a single string, or a combination of more than one string of LEDs on a strip where such further LEDs can provide light at different wavelengths. As discussed hereinbefore, typically the wavelengths provided by the LED strips within the arrays herein are red 640 nm, blue 460 nm and green 560 nm, although many more wavelengths are possible depending upon the particular arrangement selected.

As detailed herein the number of individual LEDs (11) on each LED strip (5) can be as little as one, with the maximum number being determined by the DC voltage available from the rectifier divided by the forward voltage required by each LED. For example, at the maximum safe voltage of 50 v AC RMS which would convert to 74 v DC with a typical red LED forward voltage of 2.2 this would be 33 LEDs. Each of the LEDs (11) in the exemplary strip (5a) is surface-mounted onto the aluminium T-shaped host strip (as illustrated hereinafter) as detailed in the description herein.

FIG. 12: illustrates a section of an exemplary aluminium T-shaped host strip as indicated by the dotted lines in the previous Figure. For the avoidance of doubt this exemplary T-shaped host strip is suitable for use in any of the commercial and/or domestic applications detailed herein and is not limited to utility within growth systems.

Figure 13:
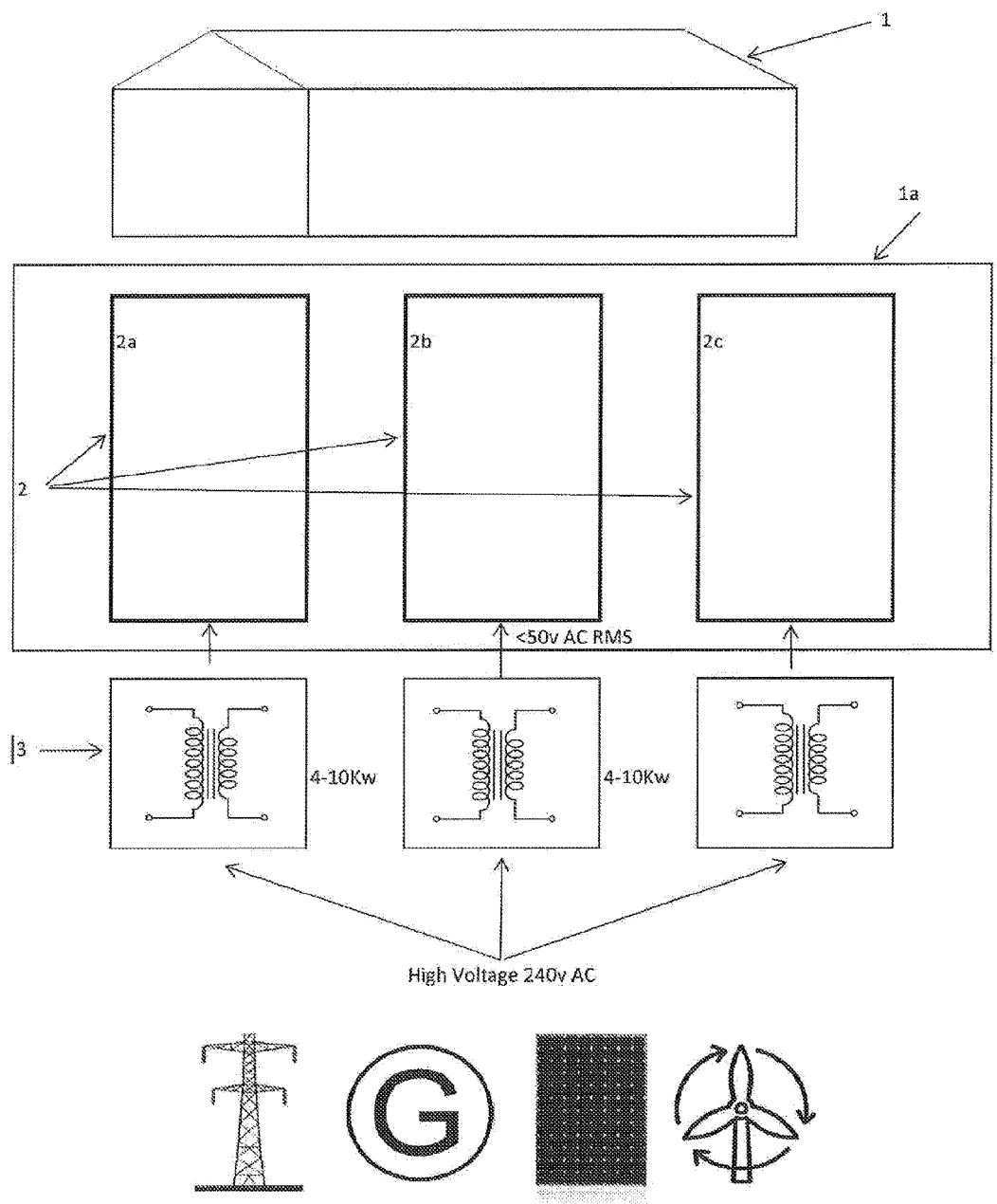
FIG. 13 illustrates a greenhouse (1) incorporating the LED array powered and controlled by the power and lighting system as detailed herein.

FIG. 13: illustrates a greenhouse (1) incorporating the LED array powered and controlled by the power and lighting system as detailed herein. The power channel from within the greenhouse to the commercial source of the power to the greenhouse site is illustrated.
Greenhouse (1) is shown in both side and overhead elevations, in this exemplary illustration the greenhouse is at least 24 m wide and is suitable for housing growing systems, which may be hydroponic or otherwise, wherein said growing systems are spaced typically at 2, 4, or 8 m spaces between each other. Within the footprint of greenhouse (1a) there is provided an outline for an LED array (2) having three sections provided by three supported structures (2a), (2b), (2c) on which LED containing strips/groups of strips are located (not shown). Structures 2(a), 2(b) and 2(c) are bus bars which are suspended from the ceiling of greenhouse (1) by suitable means and as illustrated provide equal spaces between the three sections of the LED array (2) i.e. between (2a) and (2b), and (2b) and (2c). The LED array is located above and in close proximity to three individual growth areas (not shown) wherein as will be appreciated these growth areas are located underneath and are substantially of similar area to the areas of each array (2a), (2b), (2c). In this example the three-sectioned array is positioned at from 5 cm to 10 cm above the growth area.

The three sections of the LED array are illustrated as rectangles, of particular area, but as will be appreciated the absolute shape and dimensions of either an overall array, or sections within an overall array can vary widely in relation to the need for use with different growth areas as detailed hereinbefore. Three large AC to AC transformers (3) are located outside of the greenhouse, each of which receives power from any suitable source of 240 v AC such as a power line, a source of solar power, and renewable power sources such as wind power. The transformers (3) convert this 240 v AC input power to less than 50 v AC RMS prior to entry into greenhouse (1) wherein the so-converted low voltage AC power is provided via a bus bar assembly having one or more main bus bars for the provision of power to each of the three sections of the LED array (2) as supported by the bus bar structures (2a), (2b) and (2c) which comprise a secondary bus bar system of the LED array (2) in combination with local rectifiers/local voltage correction device(s) associated with the LEDs (not shown) as detailed hereinbefore. For example, each LED strip (5) within any group of LED strips may include a local rectifier (6) at one end and be in electrical connection with the power source via the bus bar.

Figure 14:
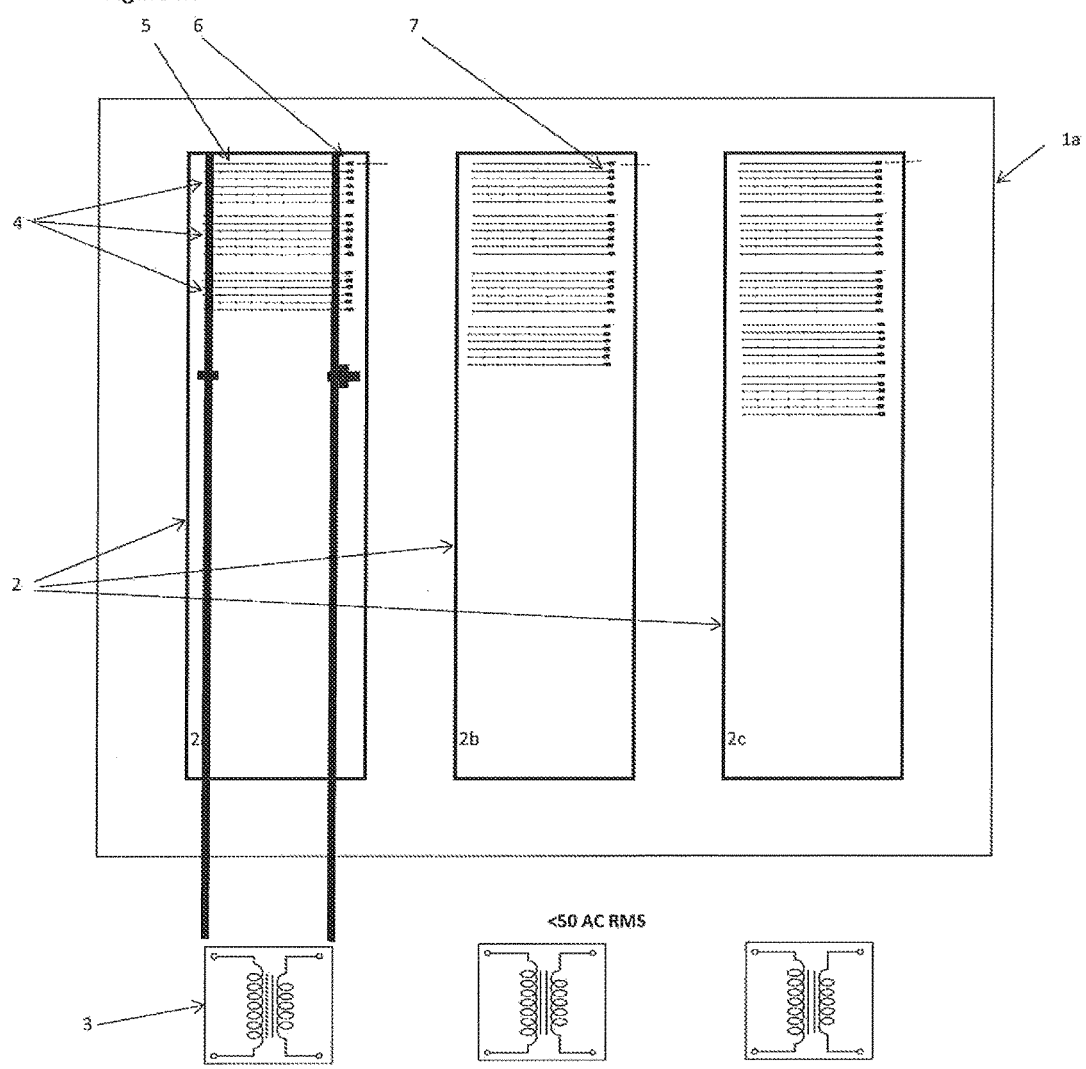
FIG. 14 illustrates a section of a controllable LED lighting system for use in a greenhouse having bus bars to distribute the power from the transformers (3) to groups of LED strips (4).

FIG. 14 illustrates a section of a controllable LED lighting system for use in a greenhouse having bus bars to distribute the power from the transformers (3) to groups of LED strips (4).

Figure 15:
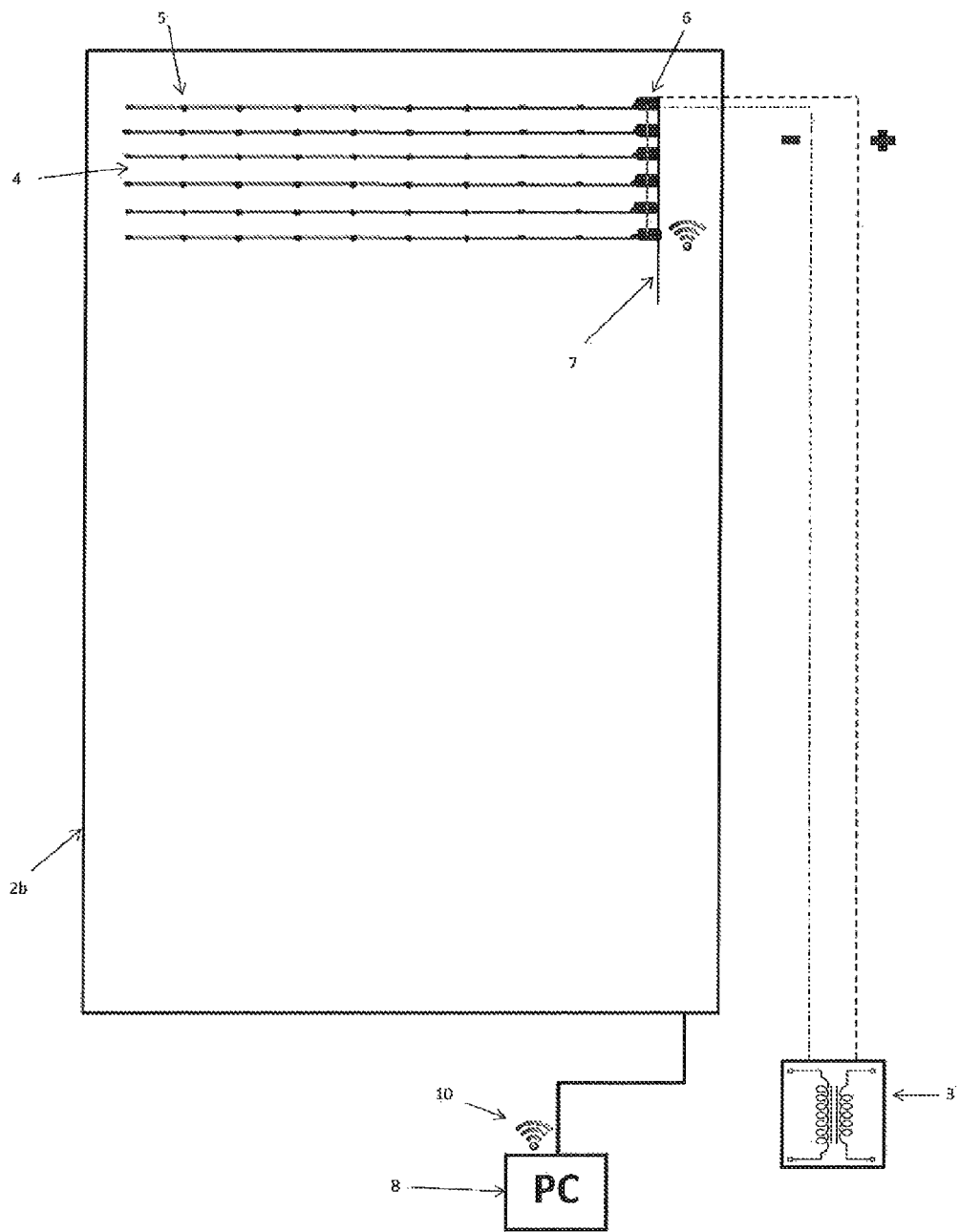
FIG. 15 illustrates a typical arrangement of six LED strips (5), arranged in a group (4) with control wire (7).

FIG. 15: illustrates a typical arrangement of six LED strips (5), arranged in a group (4) with control wire (7), wherein the local microcontroller (not illustrated) is located within PC (8), having wireless functionality (10) and rectifiers (6) capable of approximating to a perfect grid. The Figure also illustrates the connectivity and flow of current through the illustrated section from and back to the transformer (3).

Figure 16:
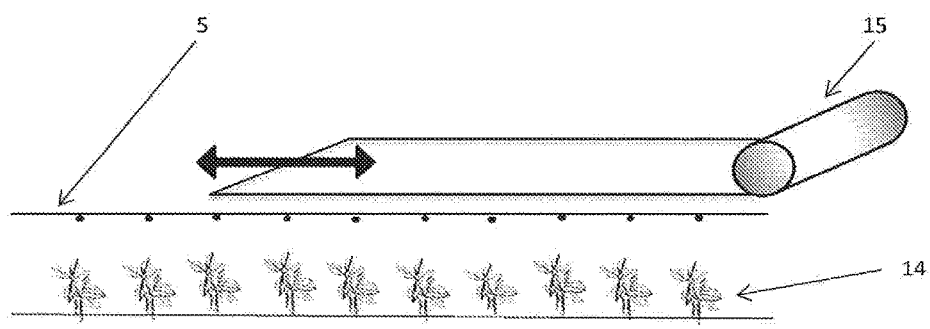
FIG. 16 illustrates an exemplary arrangement for controllable LEDs hosted upon bus bars (for power).

FIG. 16 illustrates an exemplary arrangement for controllable LEDs hosted upon bus bars (for power), with power line control means (not shown) with an optional controllable thermal screen, and as detailed in the Figure the LED strips (5) are suspended in close proximity to and above a growing crop (14). The suspension means is not illustrated, but can be any of the suspension means detailed hereinbefore. Similarly the connectivity and control features for the system illustrated can be any of those discussed and as exemplified herein, and particularly as illustrated and discussed in the two preceding Figures.

Typically such growing crops would be on horticultural flood benches or similar form of hydroponic growing system. The crop could be in soil or peat where a drip or underground watering system is installed. In the event that overhead watering is required it might be necessary for the LED strips to be raised sufficiently to allow this to take place, and as described hereinbefore this could happen automatically. The LED strips (5) are typically between 2 m and 4 m long and are suspended at each end by an appropriate structure such as for example high tensile wires incorporating the ability to be either raised or lowered automatically. As detailed hereinbefore and as illustrated using the present improved and controllable LED array(s) it is possible for the first time to locate LEDs very close to a growing crop, and in particular at distances as low as from 5 cm to 10 cm from the growing crop because the T-shaped system enables dissipated heat to be distributed from the heat sink into the growth system for the benefit of plant growth and overall increased system efficiencies.

Where the temperature around the crop is greater than required the normal greenhouse ventilation system would remove this heat using the installed ventilation and cooling equipment which is also likely to control humidity and $CO_2$.

Where the temperature at the crop is below the target temperature a unique feature of this design is the ability to install a thermal optical screen (15) designed from polythene or similar where the transfer of natural light is high whilst at the same time giving reasonable thermal qualities. These screens can either be extended or retracted according to the conditions using either a roller type system or a concertina system.

Figure 17:
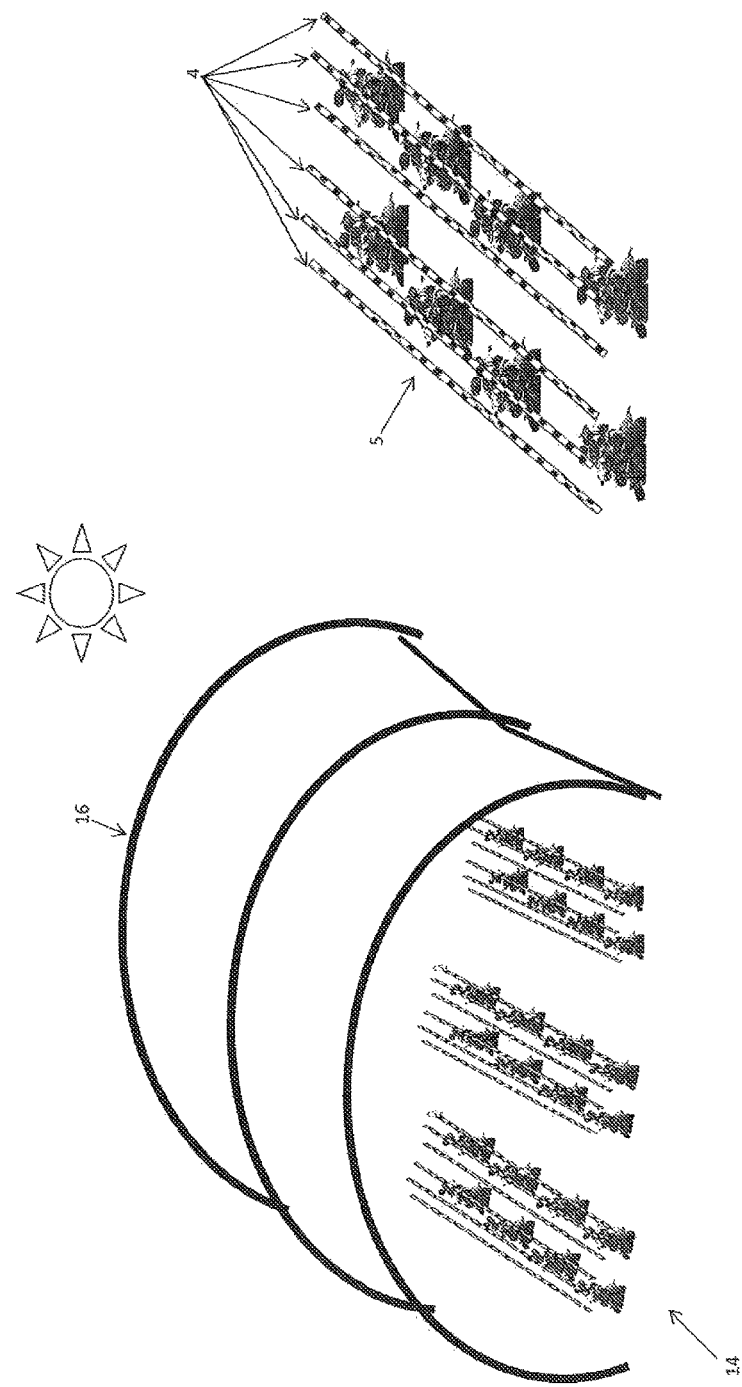
FIG. 17 illustrates an overhead controllable LED array suitable for use in a growth system.

FIG. 17: illustrates an overhead controllable LED array suitable for use in a growth system wherein the LEDs (on T-shaped strips) are supported via bus bars (not shown) which provide the low voltage AC power, and wherein the control for the LEDs is via powerline (not shown) and in particular illustrates a section of a polytunnel (16) or greenhouse having 3 separate rows of growing plants arranged in two parallel lines (8 plant lines in total), where the lighting is provided by an overhead LED array (2) comprising 3 groups of LED strips (4) wherein each group of LED strips includes 6 separate LED strips and wherein a sub group of 3 LED strips is primarily associated with a single line of plants. The means for suspension of the LED is not shown, nor is the connectivity to the control means. Each row of plants 4 groups of each 8 rows of plants (15) with 3 LED strips above.

FIG. 18: provides illustrations of alternative arrangements of LEDs strips suitable for use in the controllable power and lighting systems for use in growth systems according to aspects of the present invention. Illustrations of how LED strips could be arranged alongside and underneath growing organisms/plants respectively are provided in FIGS. 18A and 18B.

Figure 19:
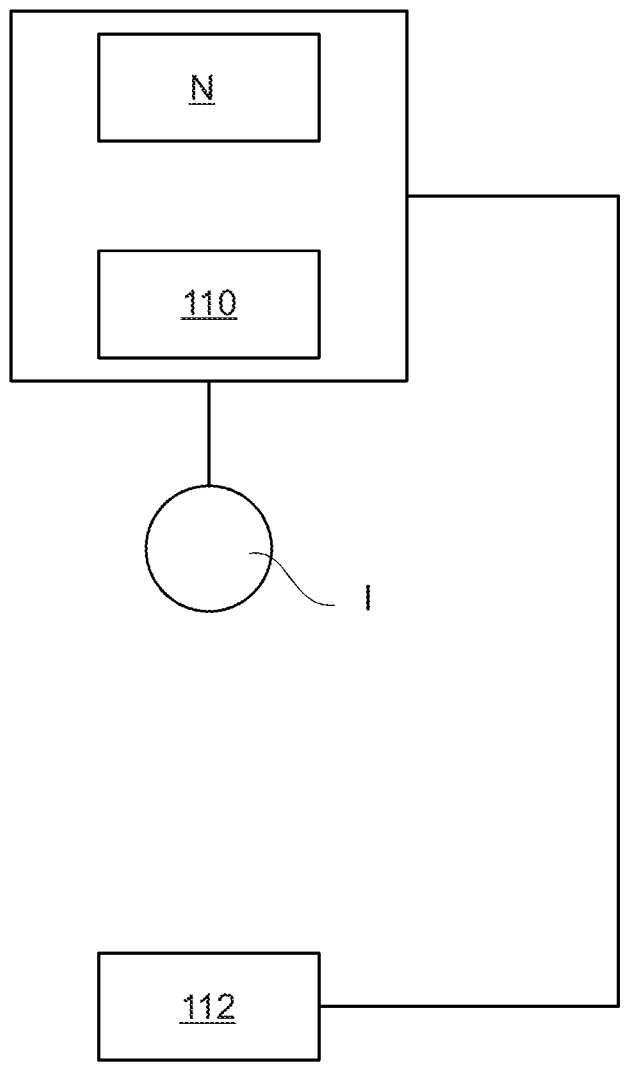
FIG. 19 provides an illustration an example of how LEDs within an LED array may be pre-calibrated using a spectroradiometer (112) and means for logging of data (110).

FIG. 19 provides an illustration an example of how LEDs within an LED array may be pre-calibrated using a spectroradiometer (112) and means for logging of data (110).

Figure 20A:
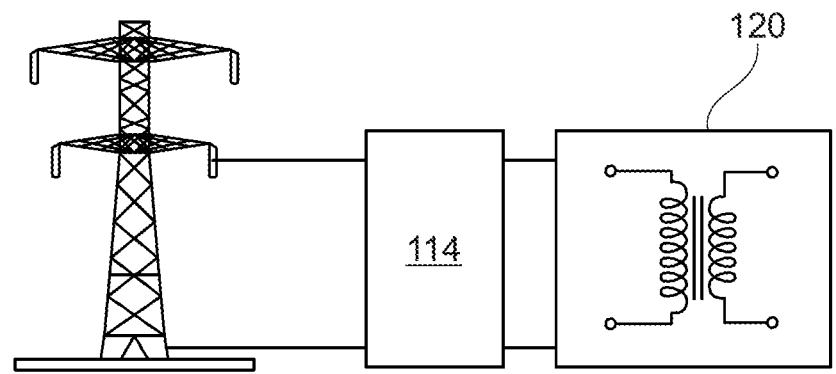
FIG. 20(a) shows an example arrangement of means for protecting the lighting arrangement systems or surge protection equipment (114) between the grid power and the transformer (120).
Figure 20B:
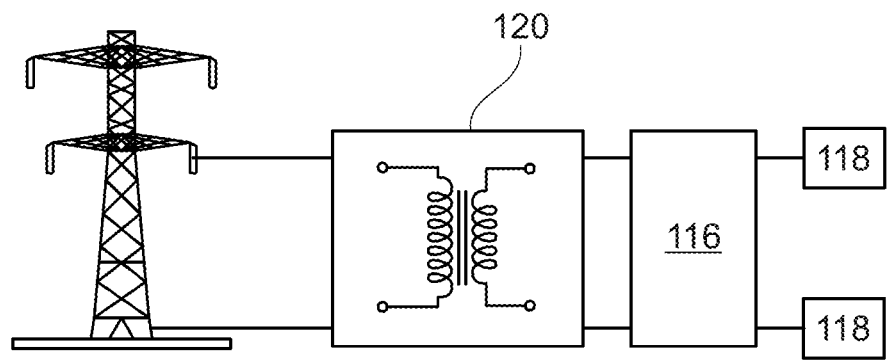
FIG. 20(b) shows an example arrangement of watchdog timer equipment (116) and fuses (118) after the transformer (120).

FIG. 20(*a*) shows an example arrangement of means for protecting the lighting arrangement systems or surge protection equipment (114) between the grid power and the transformer (120). FIG. 20(*b*) shows an example arrangement of watchdog timer equipment (116) and fuses (118) after the transformer (120).

EXAMPLES

The following representative examples describe specific embodiments of the present systems. Modifications to the capacity of the transformers used and the system to be provided with heat and light by the LED array as defined herein for use in such systems are within the scope of the present invention. In particular whilst the systems illustrated are demonstrated to have advantageous utility within systems wherein the required heat and light for growth is provided either partially or wholly by an LED array as defined herein, it should be understood that the novel LED arrays herein have applications in other fields.

Example 1—Distribution Tree at Low Voltage AC and High Currents

Taking the greenhouse system illustrated in FIG. 13 use of a large AC to AC transformer of 10 kw (Kilowatt) capacity and an LED array as defined hereinbefore provides sufficient heat and light for coverage of a growing area of from about 100 $m^2$ to about 200 $m^2$. Use of a lower capacity, 4 kw AC to AC transformer with an LED array as defined hereinbefore would correspondingly provide heating and lighting for a smaller greenhouse having a growing area of from about 40 $m^2$ to about 80 $m^2$.

Using tubular aluminium bus bars the AC to AC transformer could be increased to 150 kw or larger. This would provide sufficient power for larger growing areas of from 1,500 $m^2$ to 3,000 $m^2$ Comparative Greenhouse Example The presently available systems require local DC drivers each having a capacity of about 200 w to 300 w (watt) with subsequent powerage for only a 2 $m^2$ to 4 $m^2$ area per driver. This means that in order to deliver heat and light to a small greenhouse as indicated in Example 1, up to 40 of such drivers would be required, whilst to service the larger area in Example 1, up to 100 would be needed.

It is clear from these Examples that the novel system herein has the potential for delivery of not only significantly greater coverage than presently available, but also the concurrent provision of efficiencies in terms of heating and lighting via the unique controllable LED array.

The invention claimed is:
1. A controllable power and lighting system for commercial and/or domestic use comprising an LED array comprising LED lights wherein the LED array is powered by an AC low voltage, the low voltage AC power being less than or equal to 50 v AC, power supply wherein:
   (i) the low voltage AC power distributed to the LED array is linked to a AC main transformer which is positioned externally or internally;
   (ii) the low voltage AC power is distributed by hollow bus bars;
   (iii) the low voltage AC power supplied to each LED light, or group of LED lights is converted to low voltage DC at an AC/DC rectifier associated with each LED light, or group of LED lights; and
   (iv) the system includes means for automatic control of the output of the LED array as a whole or individual LED lights, or groups of LED lights within the LED array; and
   (v) wherein the hollow bus bars are adapted to power one or more non-LED based devices within the system.
2. The system of claim 1, wherein the hollow bus bars are tubular or substantially tubular.
3. Use of a system according to claim 2, for provision of: commercial lighting; domestic lighting; street lighting wherein the low voltage AC power is distributed by the tubular bus bars.
4. The system of claim 1, further comprising power line technology in combination with communications, and registration means within the LED array and non-LED devices where present, wherein the system can be monitored and controlled remotely and wherein the remote control is web-based or wireless.

5. The system of claim 1, for use in a commercial and/or domestic building wherein the main AC transformer is located externally, at a central location to the system, or wherein the main AC transformer is located internally and centrally or at the top or at the bottom of the building, and wherein the transformer is a 240-50 v AC RMS transformer.

6. The system of claim 1, wherein the LED array comprises one or more LED lights, or groups of LED lights including: one or more LED spotlights, one or more LED floodlights, one or more LED strip lights, or one or strips containing LED lights, or any combination of LED spotlights, LED floodlights, LED strip lights, or arrays or strips containing LEDs.

7. The system of claim 1, wherein the hollow bus bars are adapted to power one or more non-LED based devices within the system.

8. The system of claim 1, further comprising power line technology in combination with communications, and registration chips within the array wherein the system can be monitored and controlled remotely by the combination of powerline and wireless technology.

9. The system of claim 1, further comprising power line technology in combination with communications, and registration chips within the LED array wherein the system can be monitored and controlled remotely by the combination of powerline and wireless technology.

10. The system of claim 1, further comprising power line technology in combination with communications, and registration chips within the LED array wherein the system can be monitored and controlled remotely by the combination of powerline and wireless technology, wherein each LED light and non-LED device within the system is registered via use of one or more LED-specific registration chips.

11. The system of claim 1, wherein the system can be monitored and controlled wirelessly and remotely using a wireless link to a local PC or via the internet remotely and wherein each individual LED is fitted with a registration strip, and a local rectifier.

12. The system of claim 1, wherein the low voltage AC power supplied to the bus bars is between 12 v and 50 v AC RMS.

13. The system of claim 1, further incorporating means for logging of data for measurement of the radiant power of the LED array or individual LEDs, or groups of LEDs within the array, and wherein where non-LED devices are present the system includes means for logging of data for measurement of power consumption.

14. The system of claim 1, further incorporating means for logging of data for measurement of the radiant power of the LED array or individual LEDs, or groups of LEDs within the array, and wherein where non-LED devices are present the system includes means for logging of data for measurement of power consumption wherein said means for logging of data for measurement of the radiant power is provided by registration of each LED within the array and pre-calibration of the LEDs by spectroradiometers.

15. The system of claim 1, further comprising movement sensors, light sensors and/or light meters linked to the LED array for provision of effective light levels to a commercial or domestic system without the need for on-going measurements of the LED wavelengths, intensities or photo periods.

16. The system of claim 1, further comprising one or more non-LED devices, wherein the one or more non-LED devices are individually selected from: laptops; personal computers; printers; scanners; dictation machines; telephone answering machines; chargers including mobile-phone chargers, tablet chargers, mobile gaming device chargers, camera and video chargers; TVs; monitors; shavers; hair trimmers; radios; smoke alarms/detectors; $CO_2$ alarms/detectors; security alarms and motion sensors; and any combination thereof including with one or more any low-voltage compatible devices.

17. The system of claim 1, wherein the control system includes means for logging of data for: measurement of: the radiant power of the LED array as a whole, or individual LEDs, or groups of LEDs within the array via calibration; measurement of light levels within the commercial or domestic area via light sensors; measurement of the power input to and/or power consumption of non-LED devices, either individually or in groups.

18. The system of claim 1, wherein one or more non-LED devices is present, and wherein each non-LED device has a lead and a plug and wherein the system further comprises a control system for the one or more non-LED devices comprising a registration chip incorporated into the device lead or plug.

19. The system of claim 1, wherein each individual LED, or non-LED device (where present) within the system is adapted to be independently controlled, and wherein groups or arrays of LEDs, or groups of non-LED devices, where present, is adapted to be selectively controlled via use of low voltage AC distributed via hollow bus bars and an automated control system comprising power line technology and wireless technology commanded by a central microcontroller.

20. The use of a system in accordance with claim 1, wherein the system further comprises means for protecting the system from electrical power surges via the use of transformer related surge protection equipment on the high voltage side of the transformer, and/or means for protecting the system from electrical power surges via the combined use of surge protection equipment, watchdog timer equipment and optionally one or more fuses on the low voltage side of the transformer.

* * * * *